United States Patent
Sheng et al.

(10) Patent No.: US 11,617,117 B2
(45) Date of Patent: Mar. 28, 2023

(54) METHODS AND APPARATUSES FOR PERFORMING CELL (RE)SELECTION IN NON-PUBLIC NETWORK

(71) Applicants: SHARP KABUSHIKI KAISHA, Sakai (JP); FG Innovation Company Limited, Tuen Mun (HK)

(72) Inventors: Jia Sheng, Vancouver, WA (US); Tatsushi Aiba, Sakai (JP); Kazunari Yokomakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/266,608

(22) PCT Filed: Aug. 8, 2019

(86) PCT No.: PCT/JP2019/031472
§ 371 (c)(1),
(2) Date: Feb. 7, 2021

(87) PCT Pub. No.: WO2020/032205
PCT Pub. Date: Feb. 13, 2020

(65) Prior Publication Data
US 2021/0314838 A1   Oct. 7, 2021

Related U.S. Application Data

(60) Provisional application No. 62/716,939, filed on Aug. 9, 2018.

(51) Int. Cl.
*H04W 36/24* (2009.01)
*H04W 36/00* (2009.01)
(Continued)

(52) U.S. Cl.
CPC ....... *H04W 36/24* (2013.01); *H04W 36/0055* (2013.01); *H04W 40/34* (2013.01); *H04W 48/16* (2013.01); *H04W 48/20* (2013.01)

(58) Field of Classification Search
CPC ............. H04W 36/24; H04W 36/0055; H04W 40/34; H04W 48/16; H04W 48/20
See application file for complete search history.

(56) References Cited

U.S. PATENT DOCUMENTS

| | | | |
|---|---|---|---|
| 2009/0011762 A1* | 1/2009 | Han | H04B 1/70735 455/434 |
| 2018/0184306 A1* | 6/2018 | Xiong | H04W 24/02 |

(Continued)

OTHER PUBLICATIONS

Lenovo, Motorola Mobility, Backhaul link initial selection[online], 3GPP TSG RAN WG2 adhoc 2018 07 NR R2-1810245, Jul. 2, 2018, Section 2.
ZTE, Discussion on IAB node initial access process [online], 3GPP TSG RAN WG1 #93 RI-1806026, May 21, 2018, Section 2,3.

(Continued)

*Primary Examiner* — Ankur Jain
(74) *Attorney, Agent, or Firm* — ScienBiziP, P.C.

(57) ABSTRACT

An Integrated Access and Backhaul (IAB) node that communicates over a radio interface is provided. The IAB node includes: processing circuitry configured to perform cell selection or cell reselection based on whether a corresponding cell is associated with an IAB donor or the IAB node. A hop number is defined for each of the IAB donor and the IAB node, where the hop number of the IAB donor is "0".

6 Claims, 13 Drawing Sheets

(51) Int. Cl.
*H04W 40/34* (2009.01)
*H04W 48/16* (2009.01)
*H04W 48/20* (2009.01)

(56) References Cited

U.S. PATENT DOCUMENTS

2020/0413457 A1* 12/2020 Hong .................... H04W 24/02
2021/0259051 A1* 8/2021 Latheef ................. H04W 76/12

OTHER PUBLICATIONS

3GPP TS 38.304, "3rd Generation Partnership Project: Technical Specification Group Radio Access Network; NR; User Equipment (UE) procedures in Idle mode and RRC Inactive state (Release 15)", Technical Specification, V15.0.0 (Jun. 2018).

3GPP TS 38.101-1, "3rd Generation Partnership Project; Technical Specification Group Radio Access Network; NR; User Equipment (UE) radio transmission and reception; Part 1: Range 1 Standalone (Release 15)", Technical Specification, V15.0.0 (Dec. 2017).

3GPP TS 38.213, "3rd Generation Partnership Project; Technical Specification Group Radio Access Network; NR; Physical layer procedures for control (Release 15)", Technical Specification, V15.0.0 (Dec. 2017).

3GPP TR 38.874, "3rd Generation Partnership Project; Technical Specification Group Radio Access Network; Study on Integrated Access and Backhaul; (Release 15)", Technical Report, V0.3.2 (Jun. 2018).

3GPP TS 38.101-2, "3rd Generation Partnership Project; Technical Specification Group Radio Access Network; NR; User Equipment (UE) radio transmission and reception; Part 2: Range 2 Standalone (Release 15)", Technical Specification, V15.0.0 (Dec. 2017).

* cited by examiner

METHODS AND APPARATUSES FOR PERFORMING CELL (RE)SELECTION IN NON-PUBLIC NETWORK

CROSS-REFERENCE TO RELATED APPLICATION(S)

The present disclosure claims the benefit of and priority to provisional U.S. Patent Application Ser. No. 62/716,939 ("the '939 provisional"), filed on Aug. 9, 2018, entitled "CELL SELECTION/RESELECTION AND HANDOVER IN INTEGRATED ACCESS AND BACKHAUL NETWORK", and claims the benefit of and priority to International Application Number PCT/JP2019/031472 ("the '472 application"), filed on Aug. 8, 2019, entitled "CELL SELECTION/RESELECTION AND HANDOVER IN INTEGRATED ACCESS AND BACKHAUL NETWORK". The disclosure of the '939 provisional and '472 application are fully incorporated herein by reference for all purposes.

FIELD

The present disclosure is related to Integrated Access and Backhaul and backhauling for New Radio (NR) networks having Next generation NodeB capabilities and signaling. In particular, the present disclosure is related to a backhaul infrastructure and design for User Equipment to determine a cell selection/reselection when an Integrated Access and Backhaul node and an Integrated Access and Backhaul donor share the same cell ID.

BACKGROUND

In Long-Term Evolution (LTE) and New Radio (NR), User Equipment (UE) and Base Stations (SBs) may be vying for resources from Integrated Access and Backhauls (IABs). IABs may be reconfigured to carry out load balance between UE traffic and backhaul traffic.

Some mobile networks comprise IAB-donors and IAB-nodes, where an IAB-donor provides UE's interface to core network and wireless backhauling functionality to IAB-nodes; and an IAB-node that provides IAB functionality combined with wireless self-backhauling capabilities. IAB-nodes may need to periodically perform inter-IAB-node discovery to detect new IAB-nodes in their vicinity based on cell-specific reference signals (e.g., Single-Sideband SSB). The cell-specific reference signals may be broadcast on a Physical Broadcast Channel (PBCH) where packets may be carried or broadcast on the Information Block (IB) section.

Demand of wireless traffic has increased significantly and improvements in a physical layer alone cannot meet this demand. Considerations have been given for IAB backhaul design. In particular, the possibility that base stations may need to connect with those who are not nearest neighbors out of load management. However, because of higher antenna gain of receive/transmit antennas for base stations, this may not be feasible.

SUMMARY

In one aspect of the present disclosure, an Integrated Access and Backhaul (IAB) node that communicates over a radio interface is provided, the IAB node comprising: processing circuitry configured to perform cell selection or cell reselection based on whether a corresponding cell is associated with an IAB donor or the IAB node, wherein a hop number is defined for each of the IAB donor and the IAB node, and the hop number of the IAB donor is "0".

In another aspect of the present disclosure, an Integrated Access and Backhaul (IAB) donor that communicates over a radio interface is provided, the IAB donor comprising: transmitting circuity configured to perform at least one synchronization signal and physical broadcast channel (SS/PBCH) block transmission, the SS/PBCH block transmission being for cell selection or cell reselection, wherein a hop number is defined for each of the IAB donor and the IAB node and the IAB node, and the hop number of the IAB donor is "0".

In another aspect of the present disclosure, a method of an Integrated Access and Backhaul (IAB) node that communicates over a radio interface is provided, the method comprising: performing cell selection or cell reselection based on whether a corresponding cell is associated with an IAB donor or the IAB node, wherein a hop number is defined for each of the IAB donor and the IAB node, and the hop number of the IAB donor is "0".

BRIEF DESCRIPTION OF THE DRAWINGS

The various embodiments of the present disclosure now will be disclosed in detail with an emphasis on highlighting the advantageous features. These embodiments depict the novel and non-obvious aspects of the invention shown in the accompanying drawings, which are for illustrative purposes only. These drawings include the following figures, in which like numerals indicate like parts.

DESCRIPTION

Figure 1:
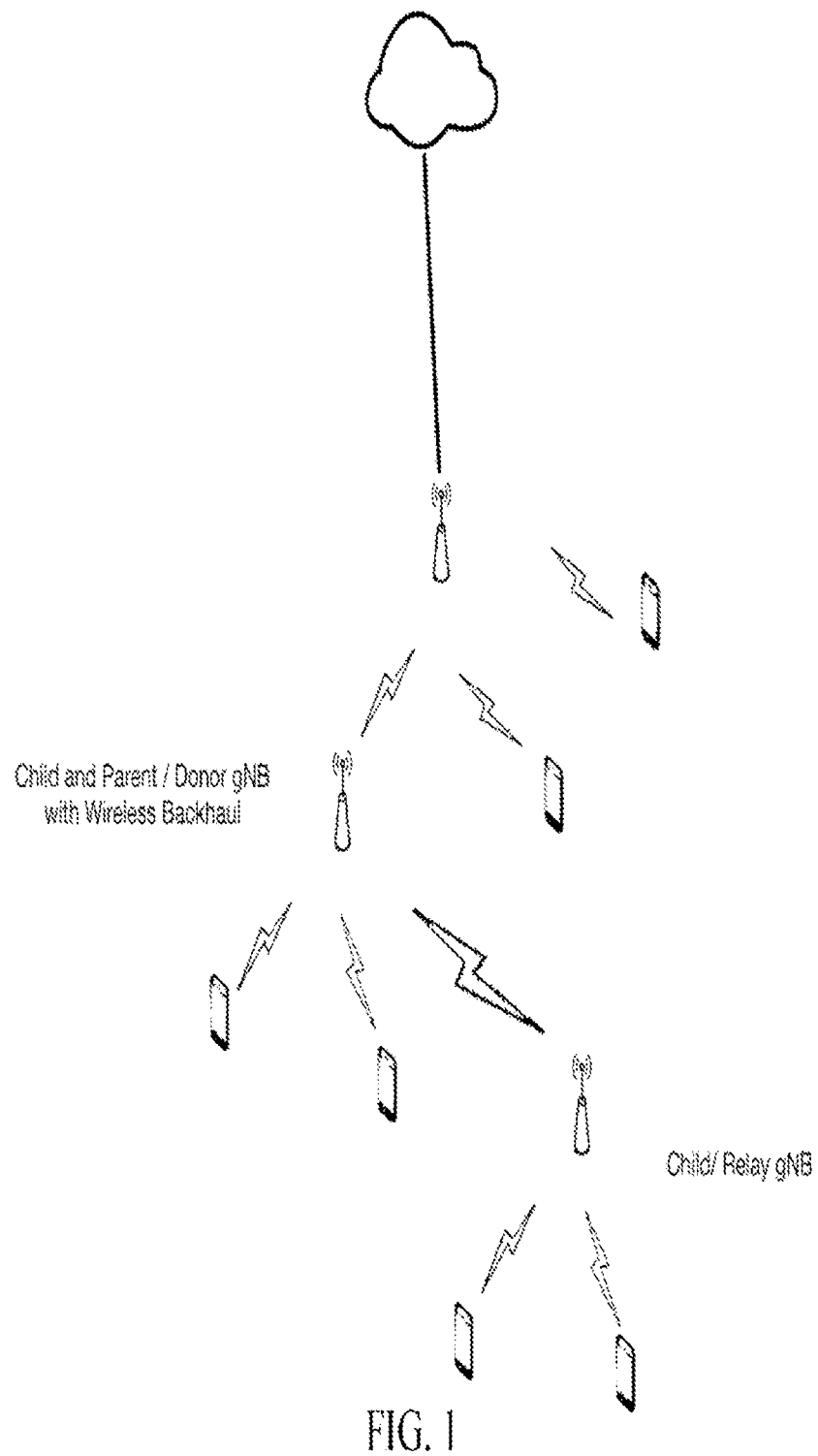
FIG. 1 illustrates a mobile network infrastructure using 5G signals and 5G base stations according to the present disclosure.

The various embodiments of the present disclosure related to Cell Selection/Reselection and Handover in an Integrated Access and Backhaul Network have several features, no single one of which is solely responsible for their desirable attributes. Without limiting the scope of the present disclosure as recited by the claims, their more prominent features now will be disclosed subsequently. After considering this discussion, and, specifically in view of the "Detailed Description," one will understand how the features of the present disclosure provides the advantages disclosed herein.

Embodiments disclosed provide a cell selection/reselection and handover mechanism for Integrated Access and Backhaul (IAB) nodes, for example, IAB-parent nodes and IAB-child nodes (may also be referred to in certain situations as IAB-donor and IAB-node, respectively) for a scenario with the IAB-donor and IAB-node having separate, i.e., different, cell IDs. That is, via the capability to distinguish IAB-donors from IAB-nodes and whether or not a priority relationship was previously specified, UEs accessing a New Radio network and IAB base stations (eNB/gNB) using resources for backhauling traffic, may determine access and identify which node they have permission to connect to and which they do not have permission. In some embodiments, based on signal strength, for example, Reference Signal Received Power (RSRP)/Reference Signal Received Quality (RSRQ) levels, and an associated threshold, a UE may determine whether to camp on the IAB-donor or IAB-node.

The various embodiments of the present disclosure related to Cell Selection/Reselection and Handover in Integrated Access and Backhaul Network now will be disclosed in detail with an emphasis on highlighting the advantageous features. Additionally, the following detailed disclosure is with reference to the drawings.

A mobile network used in wireless networks, may be where the source and destination are interconnected by a plurality of nodes. In such a network the source and destination do not communicate with each other directly due to the distance between the source and destination being greater than the transmission range of the nodes. Accordingly, intermediate node(s) may be used to relay information signals. In a hierarchical telecommunications network, the backhaul portion of the network may comprise the intermediate links between the core network and the small subnetworks of the entire hierarchical network. Integrated Access and Backhaul (IAB) Next generation NodeB utilizes 5G New Radio communications and typically provides more coverage per base station. That is, a 5G NR user equipment (UE) and 5G NR based station (gNodeB or gNB) may be used for transmitting and receiving NR User Plane data traffic and NR Control Plane data. Both the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Received Radio Link Control (RLC) Protocol.

In some aspects of the Cell Selection/Reselection and Handover in Integrated Access and Backhaul Network embodiments, a sharing of spectrum for cellular access by the User Equipment (UE) terminals and Base Transceiver Stations (BTSs or BSs) is disclosed. In one embodiment, this may be done by the physical layer, e.g., Physical Random Access Channel (PRACH). Some systems provide a PRACH for use by UEs to request an uplink allocation from the Base Station. The request may comprise a Cell ID (CID) that is a generally unique number used to identify each BTS, allowing for the IAB to determine whether the request is from a UE or BTS.

In a mobile network, an IAB child node may use the same initial access procedure (discovery) as an access UE to establish a connection with an IAB node/donor or parent-thereby attach to the network. In one embodiment, the donor or parent node and relay node may share the same Cell ID, whereas in other embodiments, the donor node and relay node may maintain separate Cell IDs. Some embodiments may use Single Sideband modulation (SSB), for example, a Channel state information reference signal (CSI-RS), for configuration among the IAB nodes. CSI-RS may provide a method of wireless communication via transmitting channel state information reference signal (CSI-RS) configuration information to user equipment (UE). The CSI-RS configuration information transmitted to the UE may provide access information for the IAB.

The present system disclosure is related to methods and devices for achieving access for IAB so that both cellular access and backhaul access may be accomplished independently. If access may not be achieved independently, the system may allow an operator to prioritize backhaul traffic and access to the time frequency resources over the cellular access. In some examples of the Cell Selection/Reselection and Handover in Integrated Access and Backhaul Network embodiments, the following consideration may be made in order to achieve the independent access or prioritized traffic:

Use of transmit power and weighted summation of Primary Synchronization Signals (PSSs) and Secondary Synchronization Signals (SSSS) as a means of distinguishing between an IAB cell and a UE access cell;

Use of Cell ID mapping to indicate the existence of PRACH resources available for IAB;

Transmission of available PRACH resources in a broadcast channel;

A signal indicating that UEs need not attempt connection in a broadcast channel—thereby signaling that a gNB cell corresponds to a backhaul cell, e.g., only IAB is permitted to attached and connect;

Means for coordination of IAB cells SSB transmissions.

In one embodiment, the system may provide a method for controlling access to the IAB node of the mobile network by a User Equipment (UE), where only other IAB nodes are permitted to attach and connect. In this embodiment, a signal indicating that UEs need not attempt connection may be transmitted by using discovery information from the IAB on a broadcast channel (carried by Physical Broadcast Channel (PBCH)), where the broadcast channel is carrying information bit(s). That is, the UE may detect a synchronization signal while deciding which cell to camp on and the IAB may be signaling that an IAB node (or gNB cell) corresponds to a backhaul cell and bar/prevent the UE from camping on the IAB node. Since the IAB node itself may be configured to listen for (or attempt to receive) synchronization signals from UEs and other IAB nodes (parent IABs), via PSS or SSS on the SSB, the IAB node may obtain the cell identity (Cell ID) and determine a set of parameters associated with the device sending the signal. That is, in some embodiments, the synchronization signal may comprise discovery information via which the IAB may derive the Cell ID and location of the broadcast channel for the device sending the signal, to then determine the set of parameters. In the scenario where the IAB node and UE share the same bandwidth, the parent gNB may broadcast synchronization signal and broadcast channel to UE and the IAB child nodes.

In one embodiment, the IAB child node may determine a Cell ID via the received synchronization signals which have been mapped to the Cell ID, and use the determined set of parameters transmitted and received, for a broadcast attempt, to get into connected mode with the IAB parent node or gNB. Thereby, the discovery information in the SSB may differentiate which terminal device is authorized to connect to the network and therefore use the signal to prevent UEs from connecting to the IAB. In this scenario, the IAB may transmit a barring signal to the UE on the broadcast control channel within the network cell and set up, based on the barring signal, access control for the service with regard to the UE by deciding whether a specific access request of the UE to the service is accepted or rejected.

In an embodiment where Cell IDs are different, the discovery information may be used to prevent UE access for load balancing reasons. That is, via the broadcast channel, when Cell IDs are different, the signal may be used to prevent UE access by determining whether it is a UE or IAB sending the signal through the lookup of parameters. In an embodiment where the IAB node and UE share the same bandwidth, the parent gNB broadcasts synchronization signal on the broadcast channel to the UEs, so the timing of the transmission to IAB node and UE is aligned. The Cell IDs may be received via a Random-Access Channel (RACH) which may be a shared channel used by wireless terminals to access the mobile network where RACH is on the transport-layer channel and the corresponding physical-layer channel is PRACH.

According to the aspects of the embodiments, the parent gNB may transmit discovery information via the PBCH to IAB nodes and UEs, where the IAB nodes and UEs read the information. If the parent gNB indicates in the discovery information that the UE is prevented from the cell due to load reason, then the UE has to find another cell on which to camp. Additionally, the IAB node can select that cell to connect to or camp on, if the discovery information from the PBCH allows it to do so. That is, a selection process allows the discovery information on the synchronization signal to indicate whether a device may camp or may not camp on the cell (IAB parent node or parent GNB). If the parent gNB does not indicate the UE is prevented from the cell in the discovery information, then the UE may continue to camp on the cell and the PRACH procedures may then start to be implemented.

The Physical Random Access Channel (PRACH) is used by an uplink user to initiate contact with a base station. The base station broadcasts some basic cell information, including where random-access requests can be transmitted. A UE then makes a PRACH transmission asking, for example, for PUSCH allocations, and the base station uses the downlink control channel (PDCCH) to respond where the UE can transmit the PUSCH. If the UE camps on the cell and the UE wants any connection with the network, it will start PRACH procedures. Thereafter, if the UE obtains PRACH resources successfully for PRACH preamble transmission, then the UE may have further communication with the network, until it successfully completes PRACH procedures to set up a connection with the network. Otherwise, the UE has to reselect PRACH resources to restart the PRACH procedures. In this embodiment, the system may prioritize the opportunity of backhaul to obtain PRACH resources successfully (if there are no conflicts with other IAB backhaul node and UEs).

An alternative embodiment consists of having a cell in which there is a single Cell ID for both cellular access and backhaul. The set of PRACH resources, specifically the PRACH sequences, may be partitioned into two sets, which may be configurable or be preconfigured and/or predefined by the network. One set is used for PRACH access for UEs, while the remainder of the set may be used for backhaul access for gNBs.

For example: Assuming the total number of PRACH preamble sequences is X, e.g., 64, the parameter numberOfRA-PreamblesGroupBackIabhaul, or numberOfRA-PreamblesGroupIabUE, can be configured, which defines the number of Random Access Preambles in a Random Access Preamble group dedicated for IAB Backhaul use or for IAB UE use.

Either numberOfRA-PreamblesGroupIabBackhaul, or numberOfRA-PreamblesGroupIabUE, or both can be configured by the network. For convenience, this is referred to as numberOfRA-PreamblesGroupIabX. The numberOfRA-PreamblesGroupIabX can be for each synchronization signal/PBCH block (SSB), or for each cell, or for each IAB gNB/UE; if it is for each IAB gNB, this means all cells belonging to/associated with the IAB gNB share the preamble sequences defined by numberOfRA-PreamblesGroupIabX.

If numberOfRA-PreamblesGroupA is configured, which defines the number of Random Access Preambles in Random Access Preamble group A for each SSB, if Random Access Preambles group B is configured, and if numberOfRA-PreamblesGroupIabX is(are) for each SSB and configured, then there are the following alternatives:

Alt 1> numberOfRA-PreamblesGroupIabX is not related to numberOfRA-PreamblesGroupA and numberOfRA-PreamblesGroupB, such that these two types of parameters are independently configured. RA-PreamblesGroupIabX may have overlap with RA-PreamblesGroupA/RA-PreamblesGroupB.

Alt 2> numberOfRA-PreamblesGroupIabX is a subset of numberOfRA-PreamblesGroupA, or numberOfRA-PreamblesGroupB. For example, assuming there are 64 RA preamble sequences, and there are 48 RA preamble sequences (e.g., RA preamble sequence index from 0 to 47, or from 1 to 48) allocated to PreamblesGroupA, and 18 sequences are allocated to PreamblesGroupB, numberOfRA-PreamblesGroupIabBackhaul may be a value not greater than numberOfRA-PreamblesGroupA, e.g., 40, which allows IAB backhaul to use preamble sequence index from 0 to 39, or from 1 to 40. Since PreamblesGroupIabUE should be a subset as well, e.g., when numberOfRA-PreamblesGroupIabUE is 10, IAB UE is allowed to use preamble sequence index from 40 to 49, or 41 to 50.

Alt 3> RA-PreamblesGroupIabX allows IAB gNB/UE to use preamble sequences with indexes mutually exclusive from PreamblesGroupA and PreamblesGroupB. For example, RA-PreamblesGroupIabX allows IAB gNB/UE to use preamble sequences with indexes 41 to 64 if the first 40 indexes are configured by the network to be used by PreamblesGroupA and PreamblesGroupB.

In an embodiment where same Cell ID action (as opposed to different Cell ID action) is used for UE access and backhaul access, since the same time frequency resources are used for UE access and backhaul access, the number of available cyclic shifts available for RACH access may decline significantly at least due to the expanded range requirements.

FIG. 1 illustrates a mobile network infrastructure using 5G signals and 5G base stations according to the present disclosure. With reference to FIG. 1, the present disclosure includes a mobile network infrastructure using 5G signals and 5G base stations (or cell stations). As illustrated, an integrated access provides gNBs with coordination between gNBs in response to changing cellular and backhaul traffic states. Therefore, load balancing may be achieved by controlling access (e.g., access class baring) to network devices (e.g., UEs). Allowing the coordination of resources may be via the Integrated Access and Backhaul topology comprising the transmission of discovery information between IAB-donors and IAB-nodes and IAB-donors and UEs, exchanged as part of the synchronization signals (if the network is not synchronized, SSB may be used for discovery instead). Accordingly, modifying the coordination to allow limiting resources that are requested by the UEs in the network due to backhaul traffic conditions may be implemented based on barring an access class associated with the UE, prioritizing use of resources based on requirements of the wireless communication system and load management, and/or partitioning resources provided by the first base station based on the class of network equipment (terminal device).

With further reference to FIG. 1, a number of UEs are illustrated in communication with gNBs where a Child gNB is in communication with a Parent gNB via wireless backhaul. For example, a Parent gNB may transmit discovery signals to a Child gNB, thereby extending the backhaul resources to allow for the transmission of backhaul traffic within the network and between parent and child for integrated access. The system provides capabilities needed to use the broadcast channel for carrying information bit(s) (on the physical channels) and providing IAB discovery information carried on the PBCH to prevent or not prevent the UE from camping. This may be done via access class baring, where access classes may be represented via partitioning the RACH. The discovery information may be used as an access class baring flag.

Figure 2:
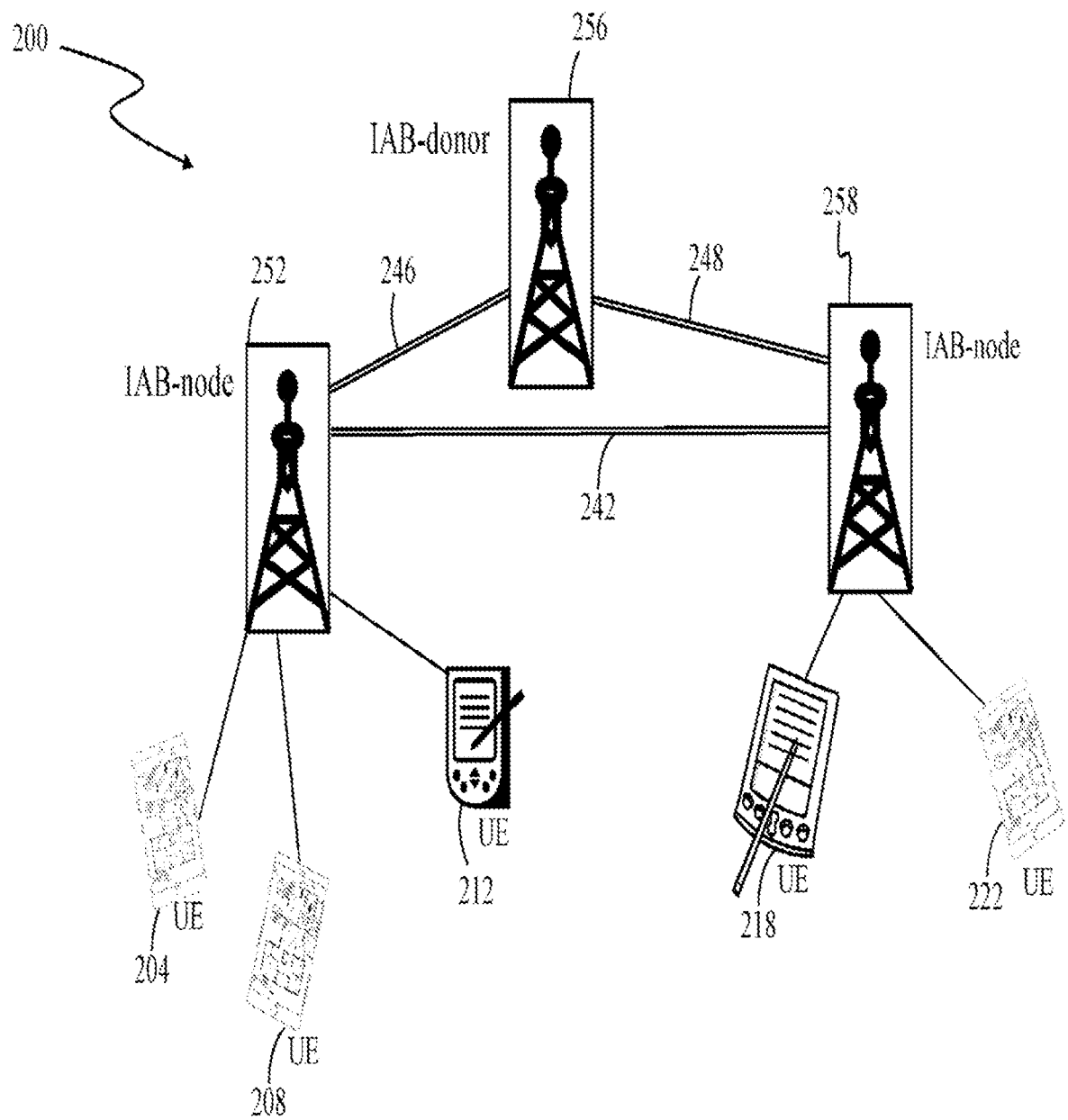
FIG. 2 illustrates a mobile network infrastructure in which a number of UEs are connected to a set of IAB-nodes and the IAB-nodes are in communication with each other and/or an IAB-donor according to the present disclosure.

FIG. 2 illustrates a mobile network infrastructure in which a number of UEs are connected to a set of IAB-nodes and the IAB-nodes are in communication with each other and/or an IAB-donor according to the present disclosure. As illustrated in FIG. 2, the IAB-nodes may send out discovery information to other devices on the network (i.e., the Cell ID and resource configuration of the transmitting nodes are sent to the receiving node). The UEs may also receive discovery information and if not prevented, then request connections and utilization of resources by transmitting connection requests to the IAB-nodes and/or IAB-donors. In one embodiment, an IAB-donor may limit or prevent any requests from UEs for connection due to the UEs being already connected to other IAB-nodes and resources committed to the backhaul traffic. In another embodiment, the IAB-donor may accept the UE's connection request but prioritize the IAB-node backhaul traffic over any connections used by the UE's. In yet another embodiment, the IAB-donor may partition resources provided by the IAB-donor between IAB-nodes and UEs, where the partitioning may be based on the load balancing requirements of the network.

Figure 3A:
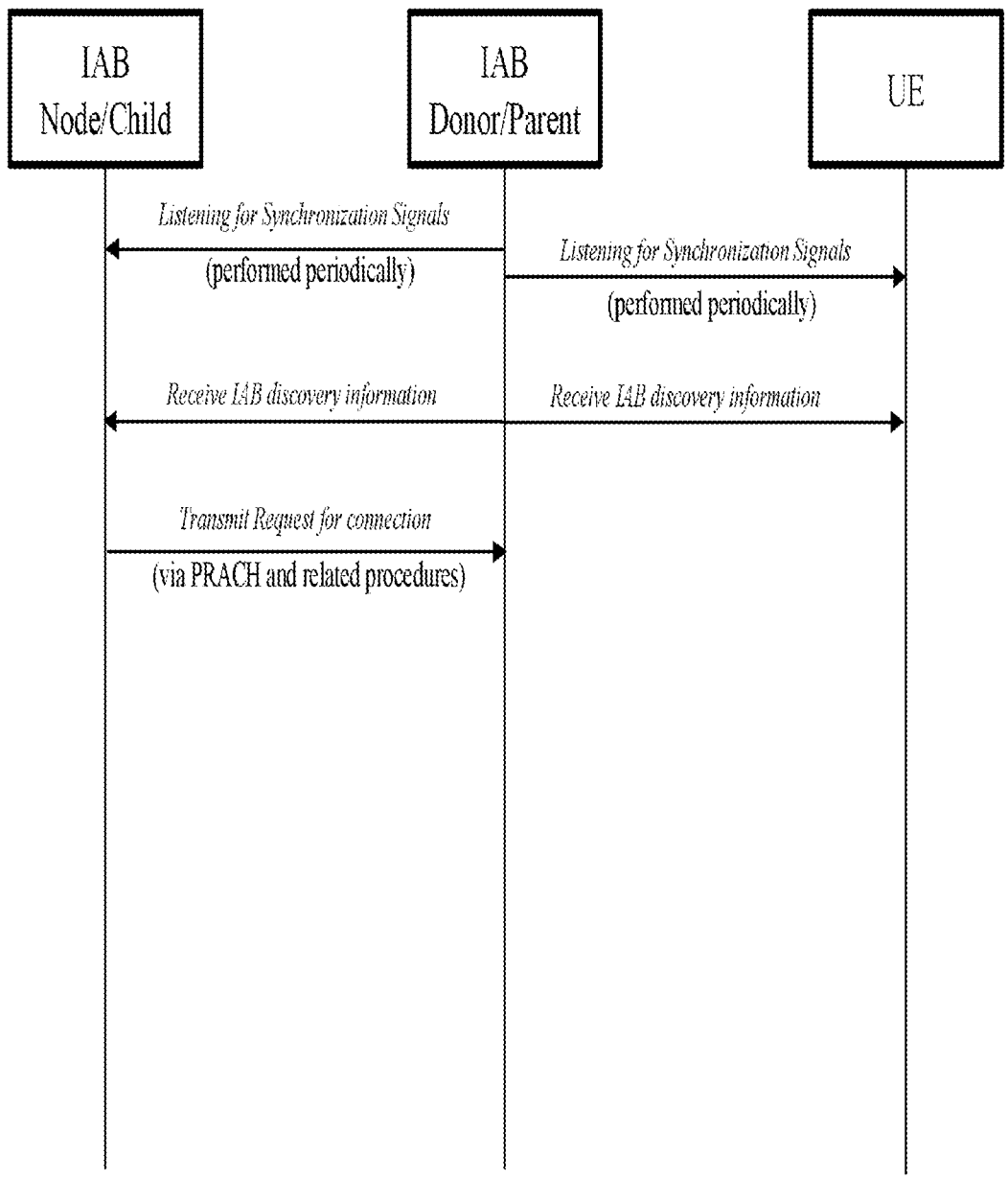
FIG. 3A illustrates information transmitting/receiving and/or processing by an IAB-donor (parent) in communication with an IAB-node (child) and UE according to the present disclosure.

FIG. 3A illustrates information transmitting/receiving and/or processing by an IAB-donor (parent), IAB-node (child), and UE according to the present disclosure. The communication method of FIG. 3 illustrates an IAB-donor determining access to resources by transmitting synchronization signals to other devices seeking to connect. In this embodiment, the IAB-node and UE may be listening for such synchronization signals on the broadcast channel. In one embodiment, IAB-nodes may periodically perform inter-IAB-node discovery to detect new IAB-nodes and/or device discovery to detect new UEs. The IAB-node and UE may receive IAB discovery signals if the IAB-node and UE share the same bandwidth. The IAB-donor determines whether any resources may be allocated to cellular traffic and whether there are IAB/gNB connections using resources for backhaul traffic. In one embodiment, IAB-donor may be specific nodes as NR cells which only connect to IAB-node children, where the synchronization information (mapped to a Cell ID) itself may not be sufficient to determine whether the IAB is an IAB-donor specific for IAB-node children or allowing attachment of UEs. Accordingly, the IAB discovery signal (e.g., waveform and/or specific sequence of bits on a broadcast channel system information block) may be used to signal that the IAB is an IAB-donor parent node and IAB-node children should attempt to connect to the IAB-donor. The IAB-node may transmit a request for connection via the PRACH and related procedures, where the PRACH may be transmitted via cell-specific signals (e.g., SSB) used for all receiving IAB-nodes. The UE may receive, via synchronization signals, the Cell ID of the parent node and, if the IAB discovery information comprises a UE baring signal and/or flag, then only the IAB-node (child) may initiate a transmission request for connection.

Figure 3B:
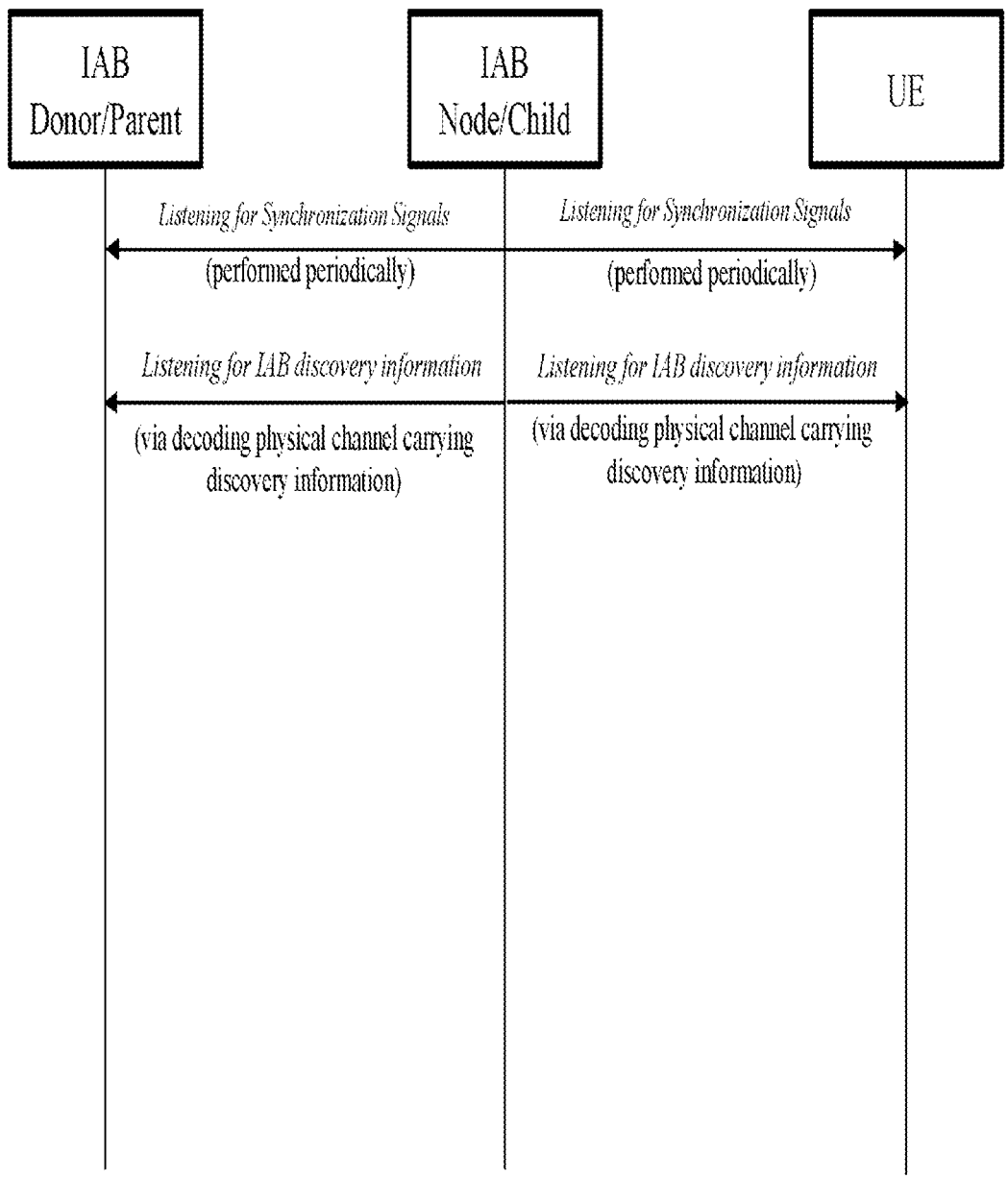
FIG. 3B illustrates information transmitting/receiving and/or processing by an IAB-node (child) in communication with an IAB-donor (parent) and UE according to the present disclosure.

FIG. 3B illustrates information transmitting/receiving and/or processing by an IAB-donor (parent), IAB-node (child), and UE according to the present disclosure. FIG. 3B illustrates the IAB-node (child) determining access to resources (versus FIG. 3A showing the determination from the IAB-donor (parent) perspective). The nodes and/or UEs periodically listening for synchronization signals may then request connection and may listen for IAB discovery information which may include parameters via a broadcast channel where the parameters may be used to obtain the Cell ID and identify the device. In some embodiments, this may be via decoding a physical channel carrying discovery information by both the IAB-node and UE. If the UE is not prevented from connection, a PRACH procedure may be performed. If the connection mode is for an IAB-node, the IAB-node may prioritize use of resources and allow the connection to be made by the IAB-donor via sending a signal to indicate that the cell is an IAB cell and inform IAB gNBs that it is available for backhaul transmission. If the connection mode is for a UE, the IAB-node may prevent the access class of the UE through the discovery information that indicates that UEs need not attempt connection with an IAB cell. In some embodiments, after some period of time has lapsed, the IAB-node may reconfigure itself periodically based on changing load balance management. If at the time of reconfiguration, not all resources are being used by a connection of another IAB cell for backhaul transmission, the IAB-node may accept connection from the UE but partition the resources based on changing load balance management. The IAB-node (child) may monitor the resources, and based on the requirements of the network and device, transmit barring signaling through the discovery information to the UE.

Figure 4:
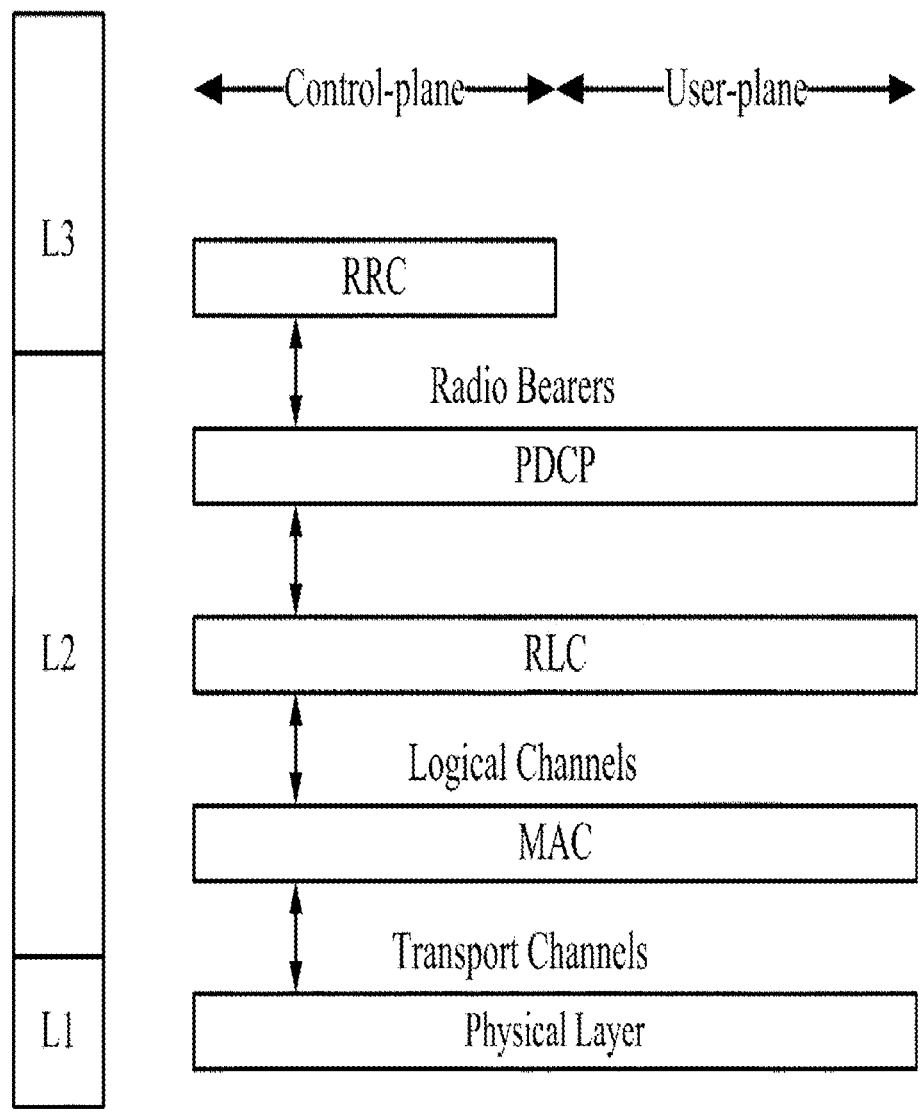
FIG. 4 illustrates a radio protocol architecture for the discovery and control planes in a mobile network according to the present disclosure.

FIG. 4 is a diagram illustrates a radio protocol architecture for the discovery and control planes in a mobile communications network according to the present disclosure. The radio protocol architecture for the UE and the gNodeB may be shown with three layers: Layer 1, Layer 2, and Layer 3. Layer 1 (L1 layer) is the lowest layer and implements various physical layer signal processing functions. Layer 2 (L2 layer) is above the physical layer and responsible for the link between the UE and gNodeB over the physical layer. In the user plane, the L2 layer includes a media access control (MAC) sublayer, a radio link control (RLC) sublayer, and a packet data convergence protocol (PDCP) sublayer, which are terminated at the gNodeB on the network side. Although not illustrated, the UE may have several upper layers above the L2 layer including a network layer (e.g., IP layer) that is terminated at the PDN gateway on the network side, and an application layer that is terminated at the other end of the connection (e.g., far end UE, server, etc.). The control plane also includes a radio resource control (RRC) sublayer in Layer 3 (L3 layer). The RRC sublayer is responsible for obtaining radio resources (i.e., radio bearers) and for configuring the lower layers using RRC signaling between the gNodeB and the UE.

In one embodiment, a Cell ID mapping to indicate the existence of PRACH resources available for IAB may be used. This transmission of available PRACH resources on the physical layer may be done in a broadcast channel and processed by the RRC sublayer of FIG. 4. In some embodiments, the differential between child/parent (node/donor) connection gNB may be determined and the gNB may represent different access classes (representable via RACH resources). Using the RACH to differential the access classes may allow a gNB to permanently prevent a UE from access to the IAB-node until the network reconfigures itself and determines there are resources available.

Figure 5:
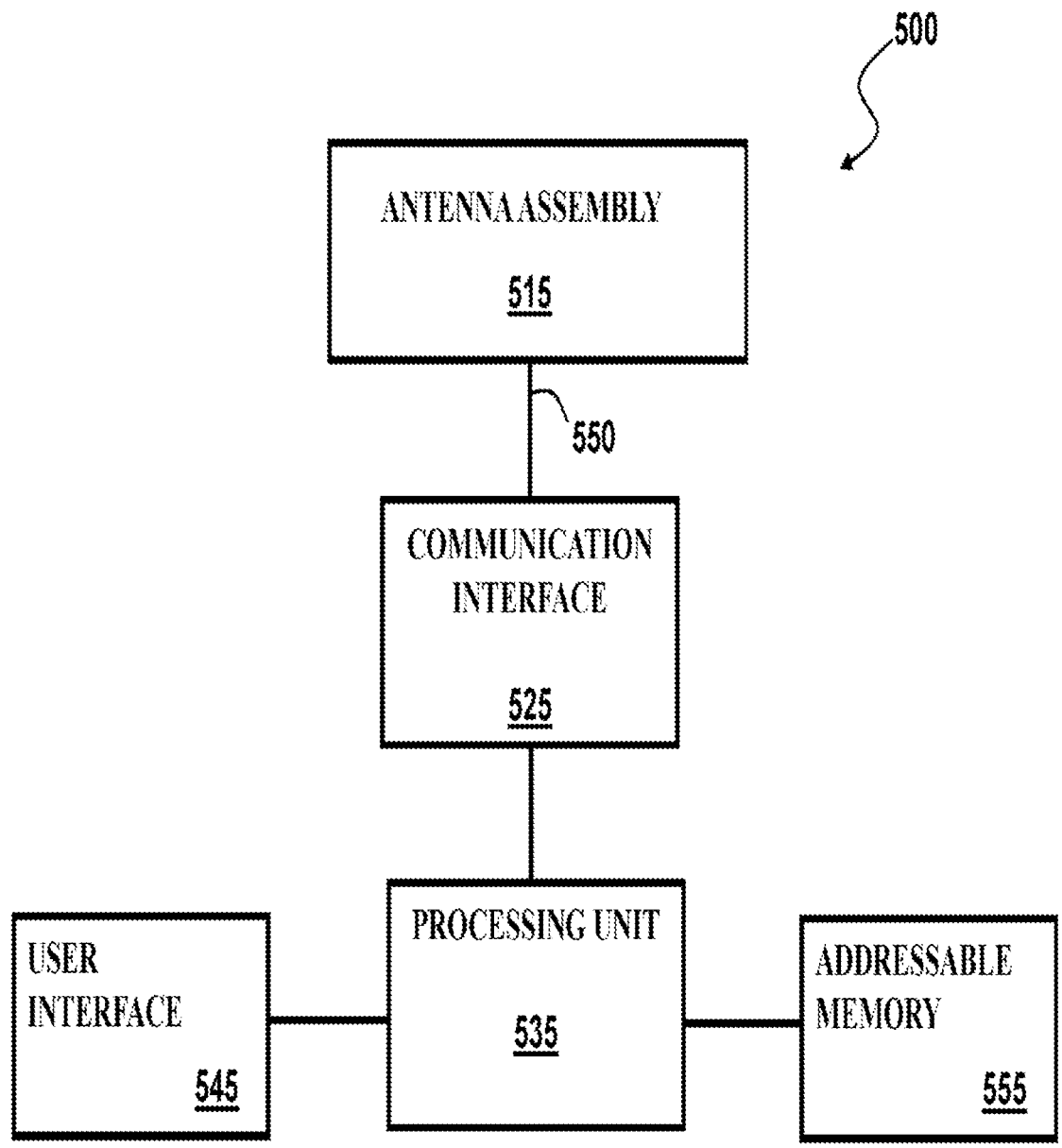
FIG. 5 illustrates a user equipment or base station according to the present disclosure.

FIG. 5 illustrates a user equipment or base station 500 according to the present disclosure. The device 500 illustrated may comprise an antenna assembly 515, a communication interface 525, a processing unit 535, a user interface 545, and an addressable memory 555. The antenna assembly 515 may be in direct physical communication 550 with the communication interface 525. The addressable memory 555 may include a random access memory (RAM) or another type of dynamic storage device, a read only memory (ROM) or another type of static storage device, a removable memory card, and/or another type of memory to store data and instructions that may be used by the processing unit 535. The user interface 545 may provide a user the ability to input information to the device 500 and/or receive output information from the device 500.

The communication interface 525 may include a transceiver that enables mobile communication device to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. The communication interface 525 may include a transmitter that converts baseband signals to radio frequency (RF) signals and/or a receiver that converts RF signals to baseband signals. The communication interface 525 may also be coupled (not shown) to antenna assembly 515 for transmitting and receiving RF signals. Additionally, the antenna assembly 515 may include one or more antennas to transmit and/or receive RF signals. The antenna assembly 515 may, for example, receive RF signals from the communication interface and transmit the signals and provide them to the communication interface.

Figure 6:
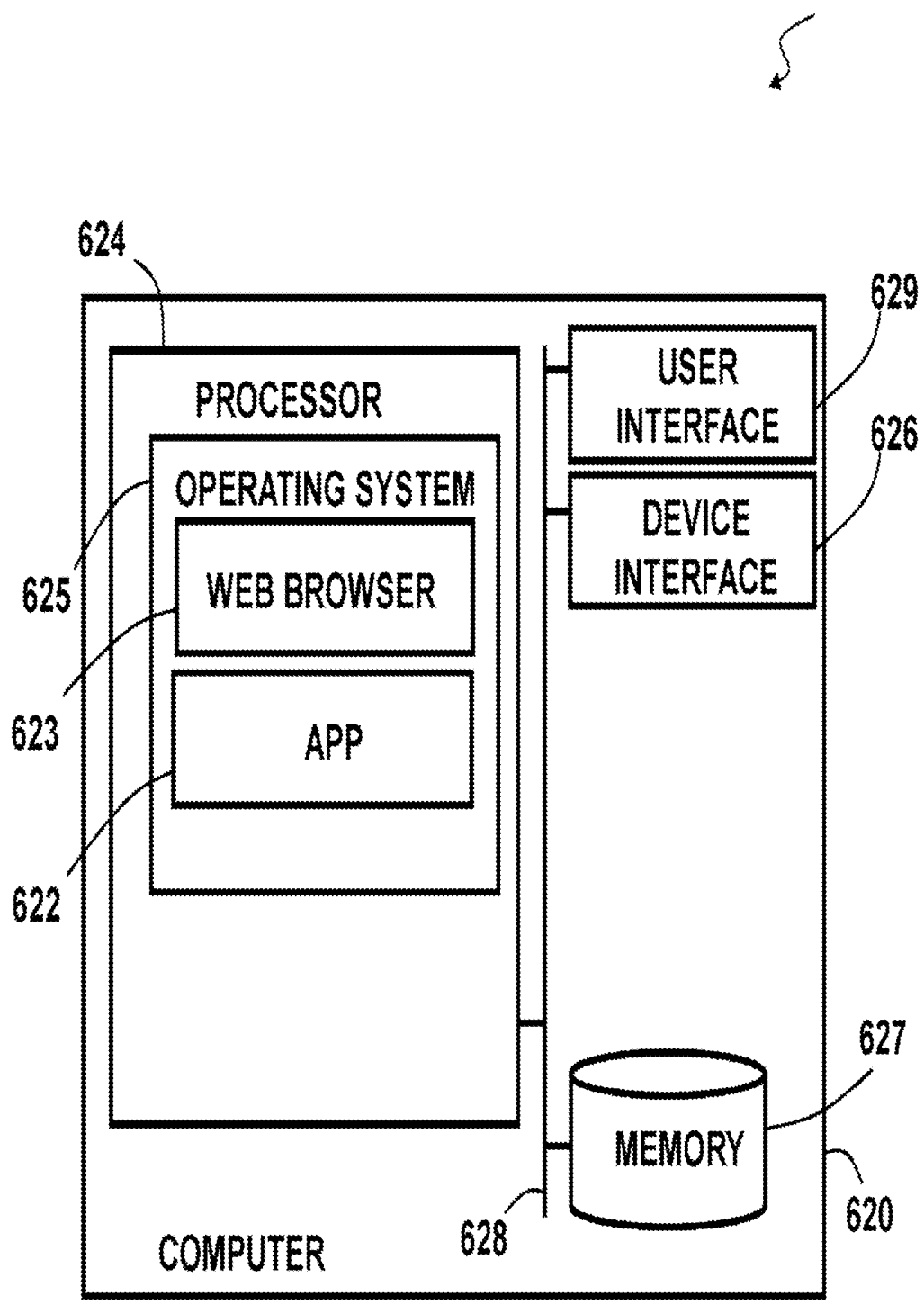
FIG. 6 illustrates a top-level functional block diagram of a computing device according to the present disclosure.

FIG. 6 illustrates a top-level functional block diagram of a computing device 600 according to the present disclosure. The computing device 620 comprises a processor 624, such as a central processing unit (CPU), addressable memory 627, an external device interface 626, e.g., an optional universal serial bus port and related processing, and/or an Ethernet port and related processing, and an optional user interface 629, e.g., an array of status lights and one or more toggle switches, and/or a display, and/or a keyboard and/or a pointer-mouse system and/or a touch screen. Optionally, the addressable memory may be flash memory, an EPROM (Erasable Programmable Read Only Memory), and/or a disk drive or other hard drive. These elements may be in communication with one another via a data bus 628. The processor 624 may be configured, via an operating system 625 such as one supporting a web browser 623 and applications 622, to execute a process establishing a communication channel according to the exemplary embodiments described above.

The term "IAB-donor" is used to represent either a "parent IAB-node" regarding an IAB-node, or a practical "IAB-donor" which is responsible for the physical connection with the core network.

An IAB-node may follow the same initial access procedure as a UE, including cell search, system information acquisition, and random access, in order to initially set up a connection to a parent IAB-node or an IAB-donor. When an IAB base station (eNB/gNB) needs to establish a backhaul connection to, or camp on, a parent IAB-node or an IAB-donor, the IAB-node may perform the same procedure as a UE, and the IAB-node may be treated as a UE, by the parent IAB-node or the IAB-donor.

When an IAB-node camps on an IAB-donor, the IAB-node obtains the physical cell identifier (PCID) of the IAB-donor, by detecting the primary synchronization signal (PSS) and secondary synchronization signal (SSS) of the IAB-donor.

Since the IAB-node is a base station, it also transmits its own PSS and SSS, indicating information relating to its PCID to all the UEs in its own coverage. Therefore, corresponding procedures may be designed for the following:

Scenario where IAB-donor and IAB-node share the same cell ID:

In NR systems, as disclosed by 3GPP specification TS 38.213, a UE assumes that reception occasions of a physical broadcast channel (PBCH), PSS and SSS, are in consecutive symbols, and form a SS/PBCH block. The Synchronization Signal (SS) block and Physical Broadcast Channel (PBCH) block are configured as a single block and transmitted together. The Synchronization Signal block may comprise a Primary Synchronization Signal (PSS) and Secondary Synchronization Signal (SSS), and the PBCH block may comprise a PBCH demodulation reference signal (DMRS or DM-RS) and PBCH Data.

The candidate SS/PBCH blocks in a half frame are indexed in an ascending order in time from 0 to L−1. A UE determines the 2 least significant bit (LSB) bits, for L=4, or the 3 LSB bits, for L>4, of a SS/PBCH block index per half frame from a one-to-one mapping with an index of the DM-RS sequence transmitted in the PBCH. For L=64, the UE determines the 3 most significant bit (MSB) bits of the SS/PBCH block index per half frame by PBCH payload bits.

In some embodiments, the SS/PBCH block transmissions may be associated with certain beam(s)' transmissions in each cell, which may be a one to one, one to multiple, or multiple to one association. For example, if a gNB has L=4 antenna beams, assuming all 4 beams are actively used for transmissions and each beam has one particular SS/PBCH block transmission, then in a period of half frame, there may exist a relationship provided as follows: the first beam of the gNB transmits SS/PBCH block with SS/PBCH block index=0 (00 in binary); the second beam of the gNB transmits SS/PBCH block with SS/PBCH block index=1 (01 in binary); the third beam of the gNB transmits SS/PBCH block with SS/PBCH block index=2 (10 in binary); and the forth beam of the gNB transmits SS/PBCH block with SS/PBCH block index=3 (11 in binary).

In an embodiment where the IAB-donor and IAB-node share the same cell ID, the IAB-node may become transmission and reception point(s) (TRP(s)), or beam(s), of the IAB-donor. Both IAB-donor and IAB-node should transmit the same PSS and SSS in their SS/PBCH blocks. However, when the UE receives the SS/PBCH block from IAB-donor and IAB-node with the same SS/PBCH block index, it may cause issues with identification of the node by the requester. For example, SS/PBCH blocks (both with index=0 from IAB-donor and IAB-node) may not be transmitted from the same antenna beam; it is more likely that the SS/PBCH blocks are not from the same antenna beam, if there is no coordination between the IAB-donor and the IAB-node. When the UE performs measurement for each beam, the UE may treat the measurement from the beams with the same SS/PBCH block index as coming from the same beam or IAB-donor/IAB-node, hence the wrong quality measurement may be calculated for that beam; consequently, wrong operations may occur based on the measurement.

Alternate embodiments are disclosed which address the issues of coordinated SS/PBCH block transmission, thereby providing correct measurements. Any single or any combination of the proposed alternative designs may be used by the IAB-donor, and/or IAB-node, and/or UE to handle and manage the miscalculation of beams having been transmitted from the same node. In one embodiment (Alt 1-A>), an indicator or flag may be carried in the SS/PBCH block to indicate whether the signal is received from the IAB-donor or from the IAB-node.

Figure 7A:
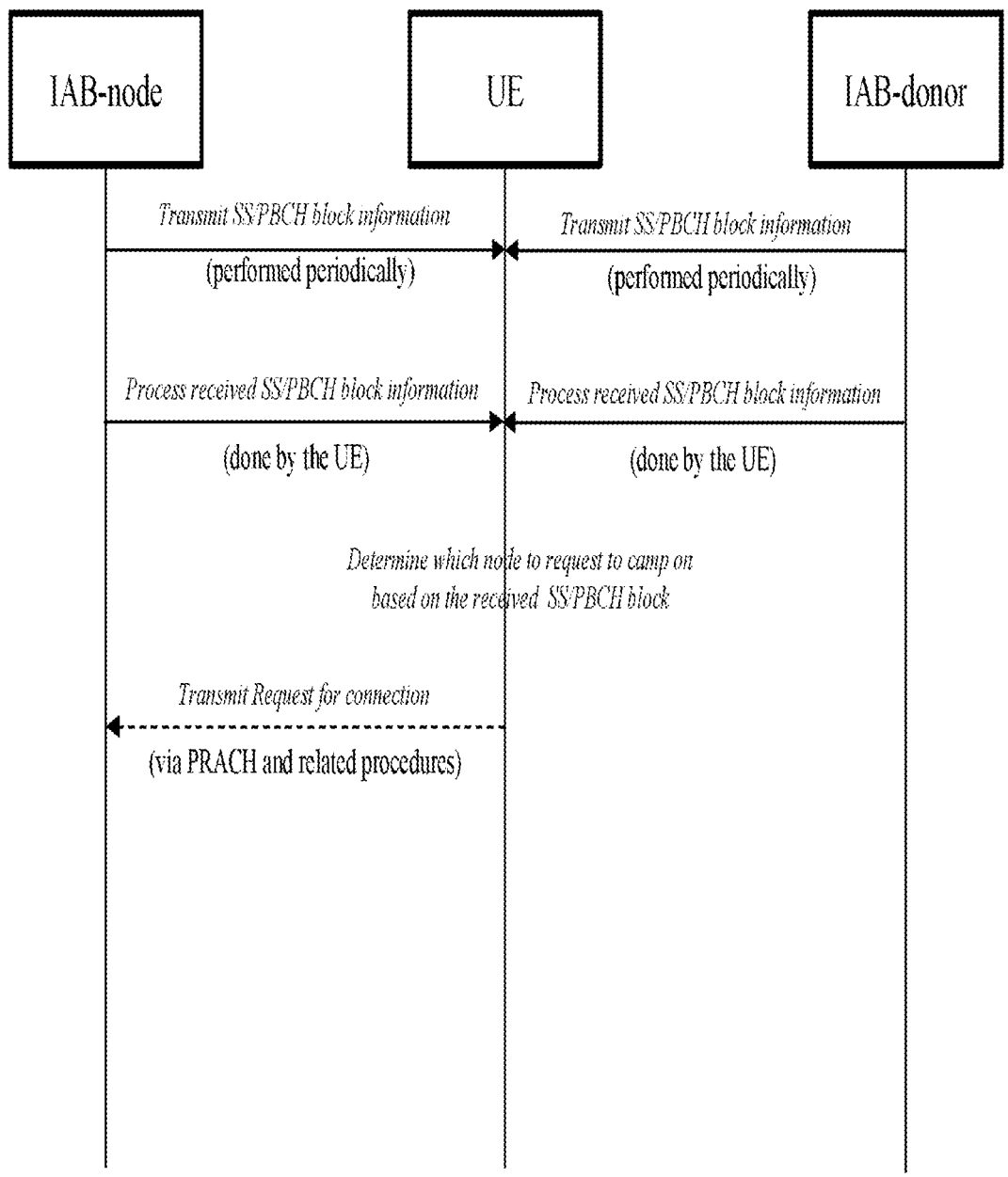
FIG. 7A illustrates information transmitting/receiving and/or processing by an IAB-node (child) in communication with an IAB-donor (parent) and UE according to the present disclosure.

FIG. 7A illustrates information transmitting/receiving and/or processing by an IAB-node (child) in communication with an IAB-donor (parent) and UE according to the present disclosure. FIG. 7A illustrates the UE listening for synchronization signal/PBCH block information from the IAB-node and IAB-donor and processing the received SS/PBCH block information to determine whether the UE may camp on the node and have access to resources. The UE may parse or process the SS/PBCH block and look, for example, for a flag or index, to determine whether the synchronization signal is coming from an IAB-node or an IAB-donor. Since both the IAB-node and IAB-donor have the same Cell ID, the SS/PBCH block carrying the flag or index (as further disclosed subsequently) indicates to the UE which node, and subsequently which beam, is transmitting the synchronization signal and whether the UE may transmit a request for connection to camp on that cell.

In one example (1-A1), 1 bit information may be carried in the PBCH of the SS/PBCH block, indicating or signaling that the SS/PBCH is transmitted from an IAB-donor, or from an IAB-node, e.g., "0" indicating IAB-donor, while "1" indicating IAB-node; or alternatively "1" indicating IAB-donor, while "0" indicating IAB-node.

In another example (1-A2), multiple-bit information may be carried in the PBCH of the SS/PBCH block. The difference from the example 1-A1 above is that multiple bits may be used to give the index of the IAB-donor and IAB-node. In this example, the network may allow/configure up to M base stations to camp on 1 base station, e.g., up to M IAB-nodes may camp on the same IAB-donor. Therefore ceil(log 2M) bits, or ceil(log 2(M+1)) bits (if counting in the IAB-donor) are required to indicate to the UE which SS/PBCH block is transmitted from which base station, e.g., M=4 and IAB-donor is counted in the index information, then 3 bits of information are required to deliver the index, so for example: "000" may indicate IAB-donor, "001", "010", "011", "100" may indicate different IAB-nodes; unused values may be reserved for other purpose.

In another example (1-A3), if hop number information is important in terms of, e.g., timing consideration, multiple-bit information may be carried in the PBCH of the SS/PBCH block. The difference from the example 1-A2 is that multiple bits are used to give the hop number information of base stations from the IAB-donor. If IAB-donor means 0 hop from itself, and up to M hops are allowed/configured by the network, then ceil(log 2(M+1)) bits are required to indicate to the UE which SS/PBCH block is transmitted from which base station with how many hops from the IAB-donor, e.g., M=4, then 3 bits' information are required to deliver the index, so for example: "000" may indicate IAB-donor itself, "001", "010", "011", "100" may indicate IAB-nodes with 1, 2, 3 and 4 hops from the IAB-donor; unused values may be reserved for other purpose.

The three examples (1-A1, 1-A2, and 1-A3) all use PBCH payload bit(s) in the SS/PBCH to carry the information. In some embodiments, the above information may also be carried in other ways or methods. For example, similar to the delivery of SS/PBCH block index information (as disclosed above in relation to the candidate SS/PBCH blocks being transmitted and indexed in half frame), some MSB or LSB bit(s) of the information may be carried by the PBCH payload bit(s), and the remaining bit(s) may be carried in another way, e.g., from a one-to-one mapping with an index of the DM-RS sequence transmitted in the PBCH.

In another embodiment (Alt 1-B>), the IAB-donor may send and/or transmit one or more signals to one, some, or all IAB-node(s) camping on its cell, to mute one, some, or all SS/PBCH block transmissions. That is, the signal from the IAB-donor may indicate that a set of one or more IAB-nodes are prevented from transmitting any SS/PBCH blocks.

Figure 7B:
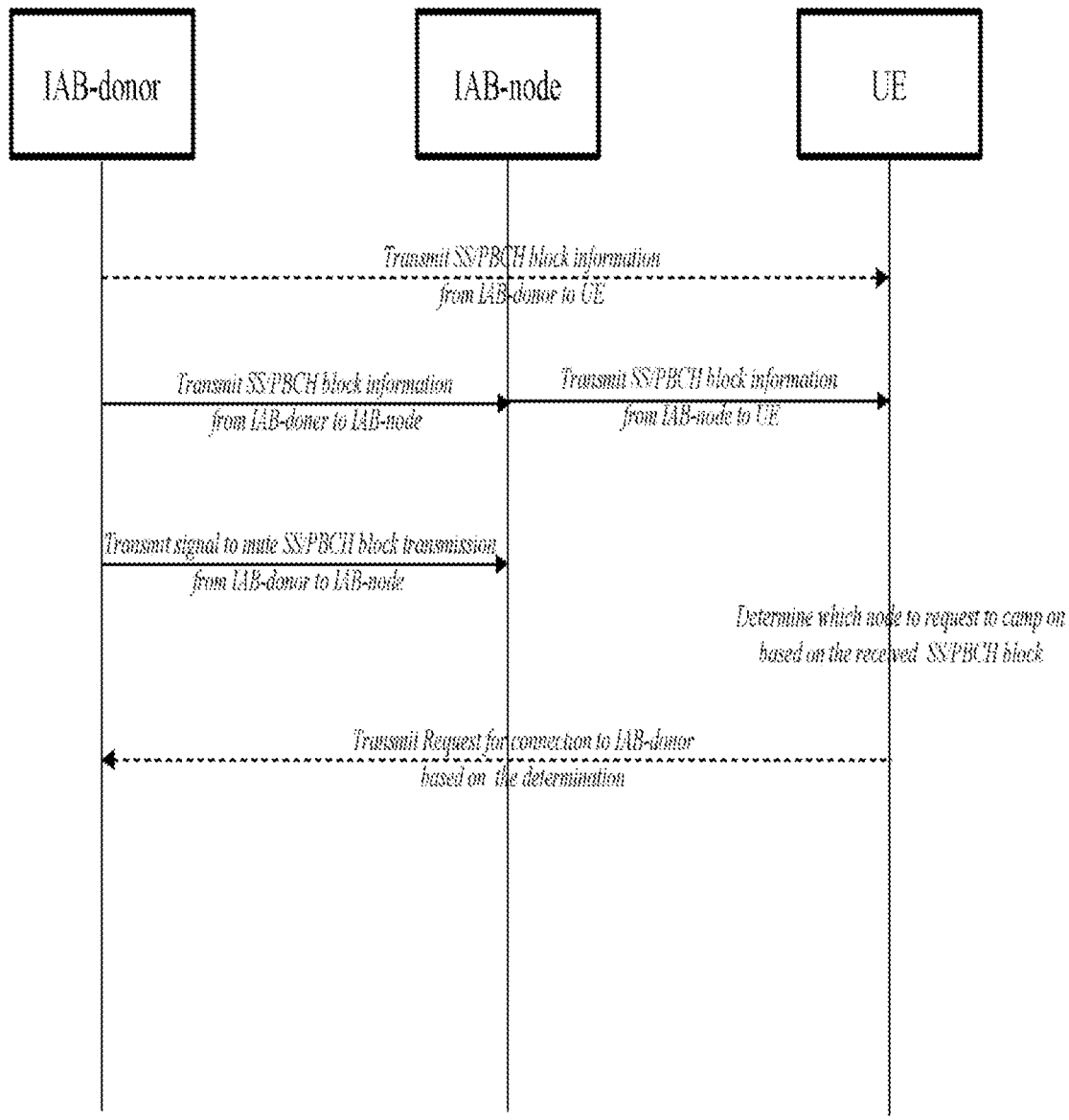
FIG. 7B illustrates information transmitting/receiving and/or processing by an IAB-node (child) in communication with an IAB-donor (parent) and UE according to the present disclosure.

FIG. 7B illustrates information transmitting/receiving and/or processing by an IAB-node (child) in communication with an IAB-donor (parent) and UE according to the present disclosure. FIG. 7B illustrates the IAB-donor and IAB-node as transmitting synchronization signal/PBCH block information to potential UEs to allow them to camp on the IAB-donor or IAB-node. As illustrated in the example, sync signals are sent out from the IAB-donor to the UE, IAB-node to the UE, and IAB-donor to the IAB-node. In this embodiment, the IAB-donor has determined that the previously camped IAB-node should no longer be sending out sync signals and transmits a signal to the IAB-node to mute the SS/PBCH block transmissions by the IAB-node, thereby effectively barring any other nodes from camping on the IAB-node. In one embodiment, the IAB-donor may continue to transmit synchronization signals to allow for the UE to camp on the IAB-donor and prevent any miscalculations of beams or signal strengths handling by the UE since both the IAB-donor and IAB-node have the same Cell ID. As disclosed subsequently, the IAB-donor may send this signal to mute transmission of SS/PBCH block by IAB-node, to a subset of a set of IAB-nodes that are camped on the IAB-donor. Additionally, the mute signal may be sent to a subset of IAB-nodes via a grouping mechanism where one or more IAB-nodes may be part of a set of groups, thereby having multiple groups each having one or more IAB-nodes as members of the group. According to this embodiment, the IAB-donor may mute IAB-nodes based on a Group ID which, if matched in signaling, those IAB-nodes would not transmit any SS/PBCH blocks.

In one example (1-B1), one bit information ("0" or "1"), which may be a ON/OFF key of SS/PBCH block transmissions may be sent to the IAB-node(s) camping on the IAB-donor cell, in either broadcasting signals or signaling (e.g., broadcasting system information), dedicated RRC signaling, or MAC control element (CE). When the IAB-node receives the ON/OFF information in the signaling, the IAB-node may then unmute or mute all SS/PBCH block transmission accordingly.

In another example (1-B2), no particular information may be sent or transmitted from the IAB-donor; instead, the existing actual transmitted SS/PBCH block information from the IAB-donor may be used by the IAB-node(s) to perform muting of SS/PBCH block transmissions.

Regarding the actual transmitted SS/PBCH block information, as it is not necessary that all beams of the base stations must work at the same time, the 3GPP specification TS 38.213 specifies that the base station may mute some of its beams in the following way:

"For SS/PBCH blocks providing higher layer parameter MasterInformationBlock to a UE, the UE can be configured by higher layer parameter ssb-PositionsInBurst in SystemInformationBlockType1, indexes of the SS/PBCH blocks for which the UE does not receive other signals or channels in REs that overlap with REs corresponding to the SS/PBCH blocks. The UE can also be configured per serving cell, by higher layer parameter ssb-PositionsInBurst in ServingCellConfigCommon, indexes of the SS/PBCH blocks for which the UE does not receive other signals or channels in REs that overlap with REs corresponding to the SS/PBCH blocks. A configuration by ssb-PositionsInBurst in ServingCellConfigCommon overrides a configuration by ssb-PositionsInBurst in SystemInformationBlockType1."

According to the above spec description, either ssb-PositionsInBurst in ServingCellConfigCommon or ssb-PositionsInBurst in SystemInformationBlockType1 provides the information of the actual transmitted SS/PBCH block(s) out of the nominal SS/PBCH block transmissions, e.g., information element (IE) ssb-PositionsInBurst carrying the value "1 1 0 1" may be interpreted as the first, second, and fourth SS/PBCH block transmitted by the IAB-donor.

When the IAB-node receives the ssb-PositionsInBurst or similar information, it may perform one, some, or all of the following:

(1) Mute all its own SS/PBCH block transmissions;
(2) Determine which SS/PBCH block(s) is (are) muted based on the node's own implementation;
(3) Mute one, some, or all SS/PBCH block transmissions which are overlapped with the SS/PBCH block transmissions from the IAB-donor.

If the IAB-node receives both the "ON/OFF" information (example 1-B1) and "ssb-PositionsInBurst" or similar information from the IAB-donor, the "OFF" command may supersede the other information and mute all SS/PBCH block transmission, while the "ON" command may either override the "ssb-PositionsInBurst" information and allow all SS/PBCH block transmissions, or be combined with the "ssb-PositionsInBurst" information to mute one, some, or all SS/PBCH block transmissions depending on the "ssb-PositionsInBurst" information and IAB-node's relevant behaviors described in the example 1-B2.

In yet another example (1-B3), the IAB-donor may receive "ssb-PositionsInBurst" or similar information transmitted from the IAB-node(s), determine which SS/PBCH block(s) of the IAB-node(s) are muted, then a dedicated bitmapping information similar to "ssb-PositionsInBurst" may be sent and/or transmitted to the IAB-node(s), indicating either which SS/PBCH block(s) of the IAB-node(s) are muted or which SS/PBCH block(s) of the IAB-node(s) are allowed for transmission. In some embodiment, the information may be sent and/or transmitted in either broadcasting signals or signaling (e.g., broadcasting system information), dedicated RRC signaling, or MAC control element (CE).

In aspects of the present embodiments (for example, the disclosed design of Alternative 1-B), the control of SS/PBCH block transmission muting may not necessarily target all IAB-nodes in each control periodicity, e.g., half a frame, or other time durations.

In some embodiments, such as in the examples 1-B1 or 1-B3, in each control periodicity, only X number of IAB-node(s), where X is an integer, e.g., X=1, may be allowed to transmit SS/PBCH block information, while all the remaining IAB-node(s) are muted.

In example 1-B2, the IAB-node may not only have conflicts with the IAB-donor SS/PBCH block transmissions, but also other IAB-node SS/PBCH block transmissions. When only 1 IAB-node is permitted to transmit in each control periodicity, there won't be conflicts among IAB-nodes' SS/PBCH block transmissions. Such control may also be combined with example 1-B1 or 1-B3, and be controlled by the IAB-donor signaling; or controlled by some other mechanisms, for example, some timer mechanisms may be related, e.g., if one IAB-node starts to transmit SS/PBCH blocks, a timer in the MAC layer of the IAB-node is activated, and when the timer expires, the IAB-node's SS/PBCH block transmission should be muted. When the network carefully designs the timer duration and timer activation timing, the conflicts of SS/PBCH block transmission among IAB-node(s) may be avoided.

Scenario where IAB-donor and IAB-node maintain separate cell IDs:

When an IAB-donor and a set of IAB-nodes maintain separate cell IDs, the UE has to decide which cell the UE will camp on, which affects the cell selection/reselection for idle Mode/state and/or inactive Mode/state UEs, as well as handover for connected Mode/state UEs, since the IAB-nodes will eventually use a backhaul connection to "re-route" the UE's traffic to the IAB-donor. Since the IAB-node cells are practically part of the IAB-donor cells, the traditional signal strength/quality (RSRP/RSRQ) based cell selection/reselection and handover may not be efficient in such mobile network environments. From a UE's perspective, since the IAB-donor and the IAB-node are different, based on having different cell IDs, the following considerations are made:

Distinguishing IAB-donor and IAB-node from UE's perspective.

During normal cell selection/reselection procedures, the UE needs to measure the strength/quality of synchronization signal and/or reference signal of cells to decide which cell to camp on. During this stage, the idle mode UE obtains this information by detecting and decoding information carried by SS/PBCH block. Therefore, the following methods disclose how to carry information indicating whether the node is an IAB-donor or an IAB-node.

In one embodiment (Alt 2-1-1>), the information may be carried by 1 broadcasting system information payload bit (e.g., MIB or System Information Block 1 (SIB1)) to the UE.

When the UE is in RRC connected mode, the information may be carried by either broadcasting system information, dedicated RRC signaling, or a MAC CE.

Figure 8A:
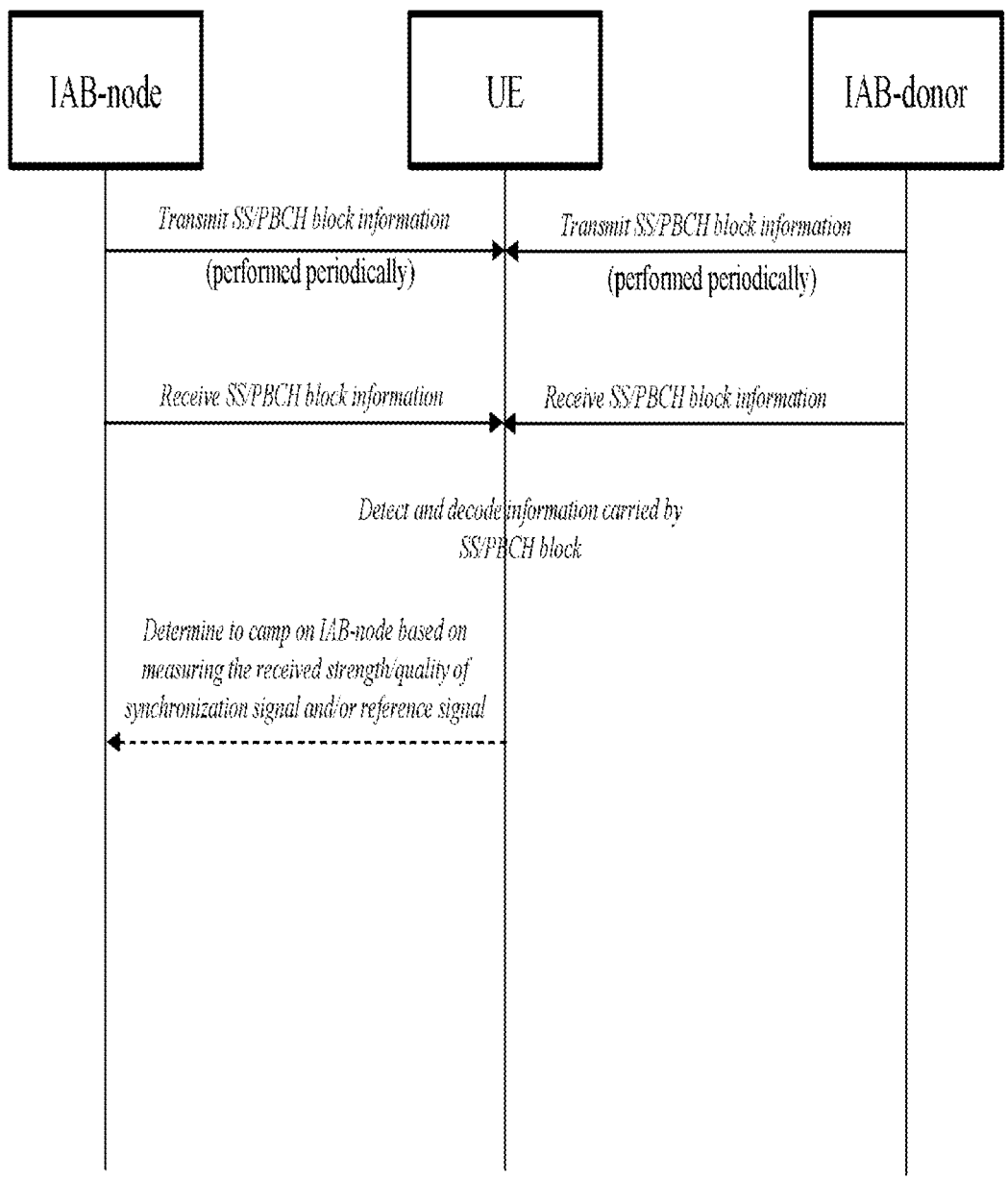
FIG. 8A illustrates information transmitting/receiving and/or processing by an IAB-node (child) in communication with an IAB-donor (parent) and UE according to the present disclosure.

FIG. 8A illustrates transmitting/receiving and/or processing by an IAB-node (child) in communication with an IAB-donor (parent) and UE according the present disclosure. FIG. 8A illustrates the IAB-node and IAB-donor transmitting SS/PBCH block information and the UE listening for such synchronization signals from the IAB-node and IAB-donor to determine whether the UE may camp on the node and have access to resources. The UE may parse or process the SS/PBCH block and look, for example, in the MIB or SIB1, to determine whether the signal is coming from an IAB-node or an IAB-donor. In this example with the IAB-donor and IAB-node having different cell IDs, the measured signal strength from the IAB-node is stronger than the IAB-donor and the UE attempts to establish a connection or camp on the IAB-node knowing and recognizing which node, and subsequently which beam, is transmitting the signal.

In (Alt 2-1-2>), the information may be carried by the synchronization signal(s).

Figure 8B:
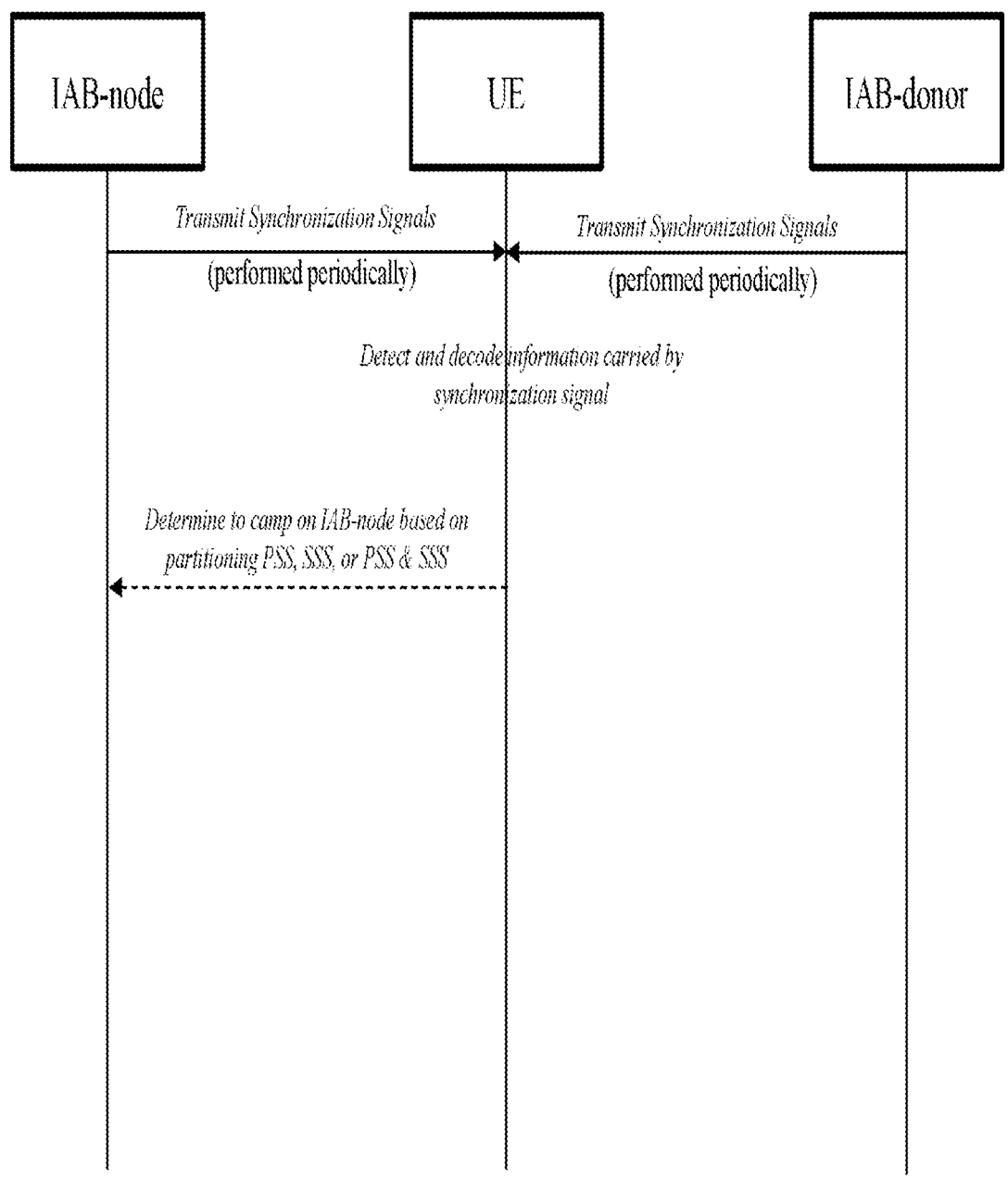
FIG. 8B illustrates information transmitting/receiving and/or processing by an IAB-node (child) in communication with an IAB-donor (parent) and UE according to the present disclosure.

FIG. 8B illustrates information transmitting/receiving and/or processing by an IAB-node (child) in communication with an IAB-donor (parent) and UE according to the present disclosure. FIG. 8B illustrates the IAB-node and IAB-donor transmitting synchronization signals and the UE listening for the synchronization signals from the IAB-node and IAB-donor and determining whether the UE may camp on the node and have access to resources. The UE may parse or process the synchronization signal and look, for example, for a partitioning in the PSS, SSS or PSS & SSS (as disclosed subsequently), to determine whether the signal is coming from an IAB-node or an IAB-donor. In this example, the UE attempts to establish a connection or camp on the IAB-node knowing and recognizing which node—and subsequently which beam—is transmitting the synchronization signal.

In 3GPP specification TS 38.211, it is specified that there are 1008 unique physical-layer cell identities given by:

$$N_{ID}^{Cell} = 3N_{ID}^{(1)} + N_{ID}^{(2)}$$

where $N_{ID}^{(1)} \in \{0, 1, \ldots, 335\}$ and $N_{ID}^{(2)} \in \{0,1,2\}$.

Hence, in the NR system there are 3 unique PSS sequences with identity from 0 to 2, and 336 unique SSS sequences with identity from 0 to 335 to construct 336*3=1008 unique physical cell IDs.

In this alternative design embodiment, since the IAB-donor and IAB-node have different cell IDs, they must use either different PSS, different SSS, or different PSS and different SSS. Therefore, partitioning the PSS, partitioning the SSS, or partitioning both of the PSS and SSS and reserving different partitions for the IAB-donor and IAB-node.

In one example (2-1-2-1), the PSS identities are divided into two mutually exclusive sets: PSSid_IAB_donor ($N_{IAB\_donor\_ID}^{(2)}$) and PSSid_IAB_node ($N_{IAB\_node\_ID}^{(2)}$), e.g., $N_{IAB\_donor\_ID}^{(2)} \in \{0\}$ and $N_{IAB\_node\_ID}^{(2)} \in \{1,2\}$; of course, this is just one example of a partitioning mechanism, there may be several methods or techniques to partition $N_{ID}^{(2)} \in \{0,1,2\}$ so as to form $N_{IAB\_donor\_ID}^{(2)}$ and $N_{IAB\_node\_ID}^{(2)}$; or the PSS identities are divided into three mutually exclusive sets, different from the case of two mutually exclusive sets, the third set is reserved for other purpose.

Using the above example partition, when the UE detects the PSS from one base station and obtains the identity of the PSS, the UE may determine that this base station is an IAB-donor if the PSS ID is 0. Otherwise, the base station is an IAB-node.

In another example (2-1-2-2), the SSS identities are divided into two mutually exclusive sets: SSSid_IAB_donor ($N_{IAB\_donor\_ID}^{(1)}$) and SSSid_IAB_node ($N_{IAB\_node\_ID}^{(1)}$), e.g., $N_{IAB\_donor\_ID}^{(1)} \in \{1, \ldots, 335\}$; or $N_{IAB\_donor\_ID}^{(1)} \in \{0, \ldots, 167\}$ and $N_{IAB\_node\_ID}^{(1)} \in \{168, \ldots, 335\}$; of course, there are just two examples of partition, there could be other ways to partition $N_{ID}^{(1)} \in \{0, \ldots, 335\}$ so as to form $N_{IAB\_donor\_ID}^{(1)}$ and $N_{IAB\_node\_ID}^{(1)}$; or the SSS identities are divided into three or more mutually exclusive sets, different from the case of two mutually exclusive sets, the extra set(s) may be reserved for other purposes. Accordingly, similar to the case of PSS partition, the UE may determine whether the base station is an IAB-donor or an IAB-node according to the detected SSS ID.

In another example (2-1-2-3), the physical-layer cell identities may be divided into two mutually exclusive sets: PCid_IAB_donor ($N_{IAB\_donor\_ID}^{Cell}$) and PCid_IAB_node ($N_{IAB\_node\_ID}^{Cell}$), e.g., $N_{IAB\_donor\_ID}^{Cell} \in \{0\}$ and $N_{IAB\_node\_ID}^{Cell} \in \{1, \ldots, 1007\}$; or $N_{IAB\_donor\_ID}^{Cell} \in \{0, \ldots, 503\}$ and $N_{IAB\_node\_ID}^{Cell} \in \{504, \ldots, 1007\}$; or $N_{IAB\_donor\_ID}^{Cell} \in \{0, 2, 4, \ldots, 1006\}$ and $N_{IAB\_node\_ID}^{Cell} \in \{1, 3, 5, \ldots, 1007\}$; of course, there are just three examples of partition, there could be other ways to partition $N_{ID}^{Cell} \in \{0, \ldots, 1007\}$ so as to form $N_{IAB\_donor\_ID}^{Cell}$ and $N_{IAB\_donor\_ID}^{Cell}$; or the physical-layer cell identities are divided into three or more mutually exclusive sets, different from the case of two mutually exclusive sets, the extra set(s) may be reserved for other purposes.

Using above disclosed partition "$N_{IAB\_node\_ID}^{Cell} \in \{, \ldots, 503\}$ and $N_{IAB\_node\_ID}^{Cell} \in \{504, \ldots, 1007\}$", when the UE detects the PSS and SSS from one base station and obtains their identities respectively, the UE may calculate its physical-layer cell identity by $N_{ID}^{Cell} = 3N_{ID}^{(1)} + N_{ID}^{(2)}$; the UE then may determine whether this base station is an IAB-donor if the physical-layer cell identity has a smaller value than 504. Otherwise, the base station is an IAB-node if the cell identity has a value less than or equal to 1007.

In (Alt 2-1-3>) the information may be carried by the positions (in terms of the time domain positions, or frequency domain positions, or both) of SS/PBCH block.

In 3GPP specification TS 38.213, the positions of SS/PBCH block are disclosed as follows:

For a half frame with SS/PBCH blocks, the first symbol indexes for candidate SS/PBCH blocks are determined according to the subcarrier spacing of SS/PBCH blocks as depicted by the following case examples, where index 0 corresponds to the first symbol of the first slot in a half-frame.

Case A—15 kHz subcarrier spacing: the first symbols of the candidate SS/PBCH blocks have indexes of {2, 8}+14*n. For carrier frequencies smaller than or equal to 3 GHz, n=0, 1. For carrier frequencies larger than 3 GHz and smaller than or equal to 6 GHz, n=0, 1, 2, 3.

Case B—30 kHz subcarrier spacing: the first symbols of the candidate SS/PBCH blocks have indexes {4, 8, 16, 20}+28*n. For carrier frequencies smaller than or equal to 3 GHz, n=0. For carrier frequencies larger than 3 GHz and smaller than or equal to 6 GHz, n=0, 1.

Case C—30 kHz subcarrier spacing: the first symbols of the candidate SS/PBCH blocks have indexes of {2, 8}+14*n. For carrier frequencies smaller than or equal to 3 GHz, n=0, 1. For carrier frequencies larger than 3 GHz and smaller than or equal to 6 GHz, n=0, 1, 2, 3.

Case D—120 kHz subcarrier spacing: the first symbols of the candidate SS/PBCH blocks have indexes {4, 8, 16, 20}+28*n. For carrier frequencies larger than 6 GHz, n=0, 1, 2, 3, 5, 6, 7, 8, 10, 11, 12, 13, 15, 16, 17, 18.

Case E—240 kHz subcarrier spacing: the first symbols of the candidate SS/PBCH blocks have indexes {8, 12, 16, 20, 32, 36, 40, 44}+56*n. For carrier frequencies larger than 6 GHz, n=0, 1, 2, 3, 5, 6, 7, 8.

It may be specified that the first symbol indexes for candidate SS/PBCH blocks are determined according to the subcarrier spacing (SCS) of SS/PBCH blocks, when the first symbol indexes for candidate SS/PBCH blocks from IAB-donor and IAB-node are specified in different time domain positions. This may depend on the SCS and carrier frequencies when the UE detects and decodes SS/PBCH block, and based on the positions of the SS/PBCH block in the half frame, when the UE determines whether the SS/PBCH block is from an IAB-donor or an IAB-node.

Case A of SS/PBCH block positions in the specification is provided as one example to describe this alternative design (where the same design is applicable to other SCS and carrier frequency cases):

15 kHz subcarrier spacing:

The first symbols of the candidate SS/PBCH blocks for IAB-donor have indexes of {x 1, x 2}+14*n. For carrier frequencies smaller than or equal to 3 GHz, n=0, 1. For carrier frequencies larger than 3 GHz and smaller than or equal to 6 GHz, n=0, 1, 2, 3.

The first symbols of the candidate SS/PBCH blocks for IAB-node have indexes of {x 3, x 4}+14*n. For carrier frequencies smaller than or equal to 3 GHz, n=0, 1. For carrier frequencies larger than 3 GHz and smaller than or equal to 6 GHz, n=0, 1, 2, 3.

If either IAB-donor or IAB-node may use the original specified positions for the first symbol of the candidate SS/PBCH blocks, this means that either {x 1, x 2}={2, 8}, or {x 3, x 4}={2, 8}; then the other one may be specified with another position, for example, if {x 1, x 2}={2, 8}, then {x 3, x 4} could be, e.g., {3, 9}. Note {x 1, x 2} can be totally different from {x 3, x 4}, e.g., {x 1, x 2}={2, 8} and {x 3, x 4}={3, 9}, or partly different, e.g., {x 1, x 2}={2, 8} and {x 3, x 4}={2, 9}, where the UE is allowed to distinguish them.

The above disclosure is in the time domain. In the frequency domain, the IAB-donor and IAB-node can also be distinguishable if the IAB-donor and the IAB-node are explicitly specified in different frequency domain positions. Therefore, the design rules in time domain are also applicable to the frequency domain.

Cell Selection/Reselection and Handover Methods:

As specified in the 3GPP specification TS 38.304 (Ver 15.0.0), with cell selection, the UE searches for a suitable cell of the selected public land mobile network (PLMN), chooses that cell to provide available services, and monitors its control channel. This procedure is defined as "camping on the cell". When camped on a cell, the UE shall regularly search for a better cell according to the cell reselection criteria. If a better cell is found, that cell is selected. UE shall perform measurements for cell selection and reselection.

When IAB-donor and IAB-nodes maintain separate cell IDs, the UE has to decide which cell it camps on.

A Cell Selection method or mechanism may be performed by one of the following subsequent procedures:

(A): Initial Cell Selection (No Prior Knowledge of Which RF Channels are NR Carriers):

As specified in the 3GPP specification TS 38.304 (Ver 15.0.0)
1. The UE shall scan all RF channels in the NR bands according to its capabilities to find a suitable cell.
2. On each carrier frequency, the UE need only search for the strongest cell.
3. Once a suitable cell is found, this cell shall be selected.

During this procedure, in an embodiment where the UE has the capability to distinguish IAB-donor from IAB-nodes, it may or may not be specified that there are priority relationships between an IAB-donor and IAB-nodes, e.g., IAB-donor is specified to be prioritized over IAB-nodes, or IAB-nodes are prioritized over an IAB-donor. Accordingly, any single, or any combination of the following design embodiments may be used to address this scenario.

If the priority relationship is specified: the case that IAB-donor is specified as prioritized over IAB-nodes is used to describe the difference from the above-mentioned procedure:
1. The UE with IAB capability shall scan all RF channels in the NR bands according to its capabilities to find a suitable cell.
2. On each carrier frequency, the UE need search for the strongest IAB-donor cell.
3. Once a suitable IAB-donor cell is found and not prevented (this is the method for the IAB-donor to avoid congestion or overloaded), this cell shall be selected; if no suitable IAB-donor cell is found or all suitable IAB-donor cell(s) is (are) prevented,
4. The UE need search for the strongest IAB-node cell in the same carrier frequency.
5. Once a suitable IAB-node cell is found, this cell shall be selected.

Figure 9A:
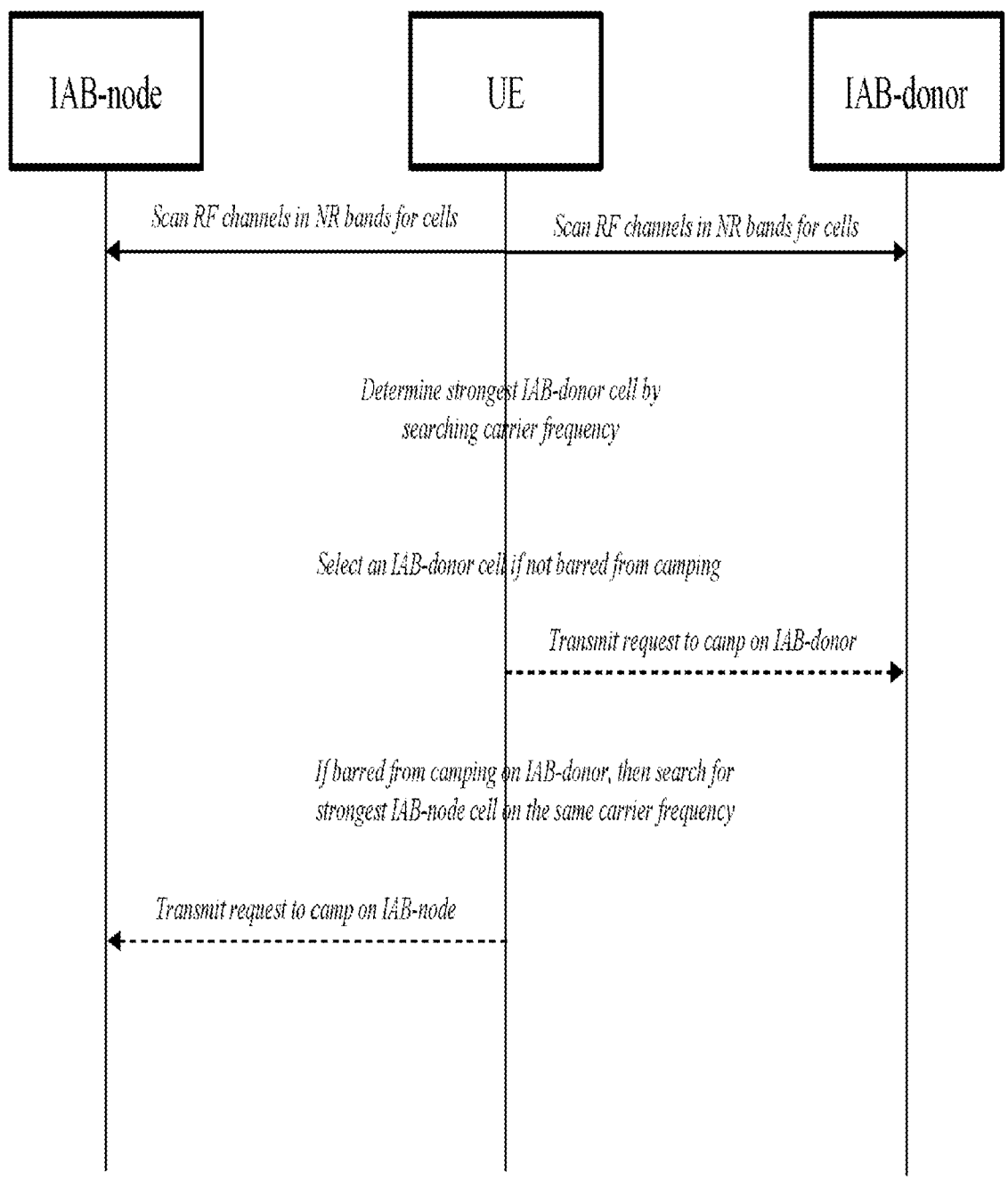
FIG. 9A illustrates a UE (having IAB capabilities) periodically performing a scan of the radio frequency (RF) channels in the New Radio bands for cells according to the present disclosure.

FIG. 9A illustrates a UE (having IAB capabilities) periodically performing a scan of the RF channels in the New Radio bands for cells according to the present disclosure. In FIG. 9A, it is illustrated that there are two cells: IAB-node and IAB-donor which are scanned, a plurality of IAB-nodes and/or a plurality of IAB-donors may be included. The UE, having a priority relationship specified or obtained, may then determine the strongest IAB-donor on the RF channel, since the IAB-donor is prioritized over IAB-nodes, and transmit a request to camp on the IAB-donor if a signal (as disclosed above) is not received indicating that UEs are prevented from camping on IAB-donors. In this example, if the UE determines that UEs are prevented from connecting to or camping on the IAB-donor, the UE may then search for the strongest IAB-node cell on the same carrier frequency. Once the UE determines which IAB-node is suitable, it may, as illustrated in this example, transmit a request to camp on the IAB-node. As previously disclosed, the request to camp to either cell is an example and not a limitation since the UE may perform other functions aside from requesting to camp on these cells.

As disclosed in step 3 of the original specification "once a suitable cell is found, this cell shall be selected" means there is a suitable cell RSRP/RSRQ level threshold for the UE to compare. In order to prioritize one type of cell over another type of cell, two suitable cell RSRP/RSRQ level thresholds may be defined, corresponding to or associated with IAB-donor cell and IAB-node cell, respectively.

If the IAB-donor is specified as prioritized over IAB-nodes, it may still be used and the IAB-donor cell may have a lower suitable cell RSRP/RSRQ threshold than the IAB-node cell. Then this affects step 3 "once a suitable cell is found, this cell shall be selected.", as it controls the UE access probability to a different type of cell, e.g., if the RSRP/RSRQ suitable cell threshold for IAB-node is set up to an infinity high value, then the UE may never have a chance of finding a suitable cell.

If the priority relationship is not specified, then the procedure is as disclosed subsequently:
1. The UE with IAB capability shall scan all RF channels in the NR bands according to its capabilities to find a suitable cell.
2. On each carrier frequency, the UE need search for the strongest IAB-donor cell and strongest IAB-node cell.
3. If only one type of cell(s) exists in that carrier frequency, or if only one type of cell(s) is not prevented in that carrier frequency, then once a suitable cell of that type of cell(s) is found, this cell shall be selected.
3. If both types of cell(s) exist and neither of them is prevented, the UE must compare the strongest suitable IAB-donor cell with the strongest suitable IAB-node cell. Some alternatives are as follows:

In (Alt 3-1>) the stronger cell shall be selected regardless of the cell type.

In (Alt 3-2>) only the stronger type of cell which has the strongest (comparing with the weaker type of cell) cell RSRP/RSRQ level is selected directly; for example, assuming both strongest IAB-donor cell and strongest IAB-node cell have cell RSRP/RSRQ level higher than their suitable cell RSRP/RSRQ threshold(s) (they may use the same suitable cell threshold or different ones), and assuming the strongest IAB-node cell has higher RSRP/RSRQ level than the strongest IAB-donor, if the RSRP/RSRQ_Offset=RSRP/RSRQ_IAB-node−RSRP/RSRQ_IAB−donor+X RSRP/RSRQ_offset_threshold, where RSRP/RSRQ offset threshold is a predefined RSRP/RSRQ level offset threshold between IAB-donor cell and IAB-node cell, and X (could be negative value, or aero, or positive value) is (are) other parameter(s) which may affect this cell selection criteria, e.g., some compensation value, then the strongest IAB-node cell is selected.

If the stronger type of cell does not have an acceptable cell RSRP/RSRQ level (determined according to the above disclosed method), then either it is up to UE's implementation as to which suitable cell is selected, or it is specified one type of cell is always selected or defaulted to, e.g., in this situation the IAB-donor is specified to be always selected.

Figure 9B:
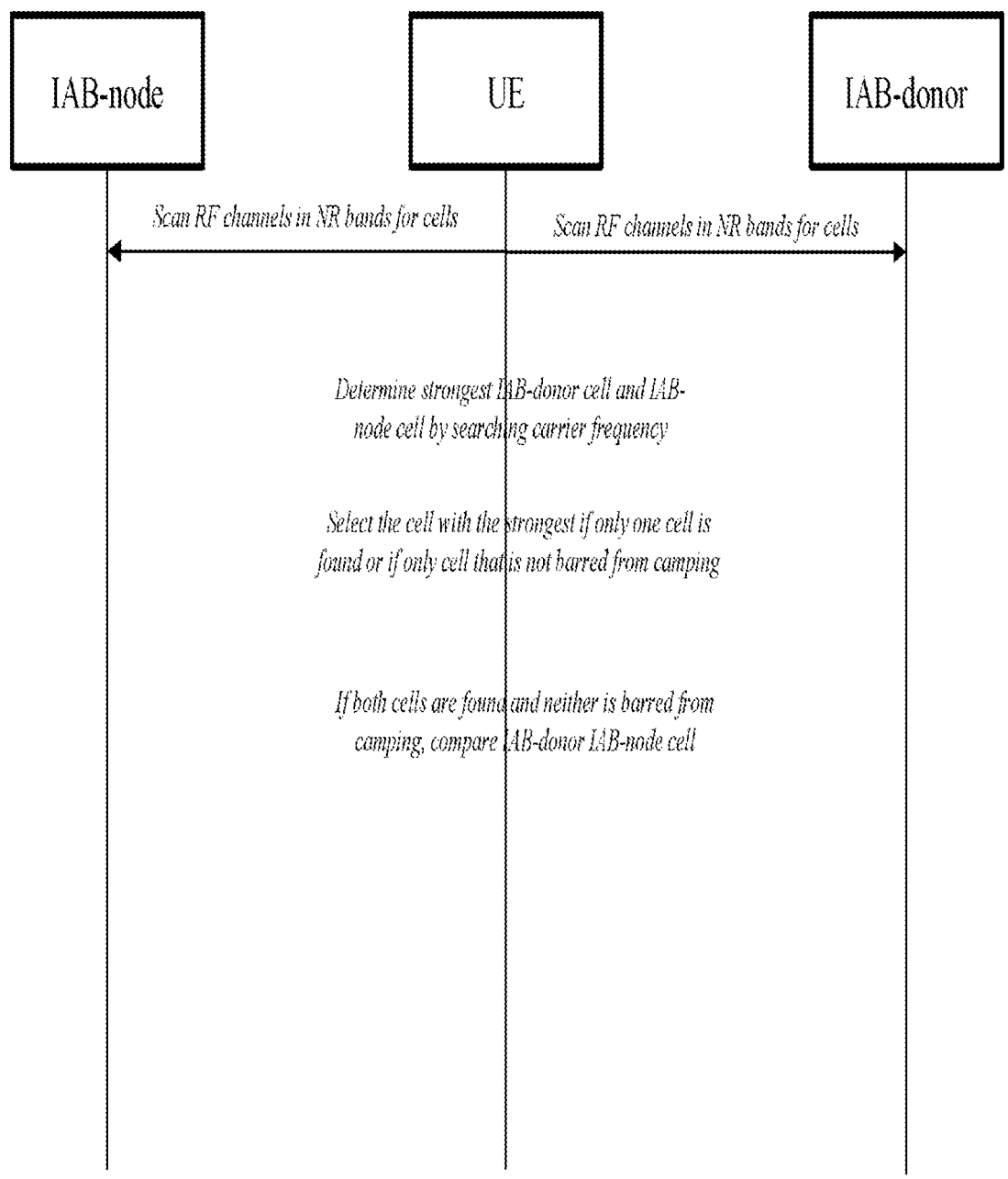
FIG. 9B illustrates a UE (having IAB capabilities) periodically performing a scan of the RF channels in the New Radio bands for cells according to the present disclosure.

FIG. 9B illustrates a UE (having IAB capabilities) periodically performing a scan of the RF channels in the New Radio bands for cells according to the present disclosure. In FIG. 9B, it is illustrated that there are two cells: the IAB-node and IAB-donor which are scanned, or a plurality of IAB-nodes may be includes. The UE, having a priority relationship not previously specified or obtained, may then determine the strongest IAB-donor and the strongest IAB-node on the RF channel, since neither the IAB-donor nor the IAB-nodes is prioritized over each other. If the UE determines that UEs are prevented from connecting to or camping on either the IAB-donor or IAB-node, the UE may then select the cell which is not prevented for the UE. Alternatively, if only one cell is found on the RF channel and the strongest cell of that type of cell is not barring connection, then the strongest IAB-node cell or IAB-donor, depending on which is available on the same carrier frequency, is selected. Once the UE determines that a suitable IAB-donor and IAB-node are available, it may, as disclosed above, compare the strongest IAB-donor to the strongest IAB-node.

(B): Cell Selection by Leveraging Stored Information:
As specified in the 3GPP specification TS 38.304 (Ver 15.0.0)
1. This procedure requires stored information of carrier frequencies and optionally also information on cell parameters from previously received measurement control information elements or from previously detected cells.
2. Once the UE has found a suitable cell, the UE shall select it.
3. If no suitable cell is found, the initial cell selection procedure in (A) shall be initiated and/or started.

During this procedure, if the UE has the capability to distinguish IAB-donor from IAB-nodes, then in step 1, the stored information should also include the information e.g., two sets of above-mentioned (step 1) information regarding IAB-donor and IAB-nodes respectively, and/or the load situation of IAB-donor and/or IAB-node.

For cell reselection and handover, absolute priorities of the IAB-donor and IAB-nodes may be provided to the UE in the broadcast signaling, e.g., system information, or in the dedicated RRC signaling, e.g., the RRCRelease message. If priorities are provided in dedicated RRC signaling, the UE shall ignore all the priorities provided in broadcast signaling.

Since the IAB-node(s) is (are) also in the IAB-donor's coverage, there is a need to reduce cell reselection/handover in order to reduce signaling cost and UE's power consumption.

When evaluating Srxlev (cell selection RX level value (dB)) and Squal (cell selection quality value (dB)) of non-serving cells for reselection purposes, the IDLE or Inactive Mode UE shall use parameters provided by the serving cell. The following rules are used by the UE to limit needed measurements in IAB network:

If the serving cell has lower IAB priority (e.g., if IAB-donor is prioritized over IAB-node and the serving cell is IAB-node cell), the UE shall perform intra- and/or inter-frequency measurements of higher priority IAB cells If the serving cell has higher IAB priority, and if the serving cell fulfils Srxlev>$S_{IABIntraSearchP}$ and Squal>$S_{IABIntraSearchQ}$, the UE may choose not to perform intra-frequency measurements, where $S_{IABIntraSearchP}$ and $S_{IABIntraSearchQ}$ are newly defined RX level and quality level thresholds for UE to perform intra-frequency measurement in IAB networks, which can be defined lower than regular $S_{IntraSearchP}$ and $S_{IntraSearchQ}$; if the UE is only configured for IAB network, then the UE needs these two thresholds only; if the UE gets involved in both regular NR and IAB networks, even if it is triggered for cell reselection among regular NR cells, the UE cell reselection in IAB network which relates to IAB-donor and IAB-nodes won't be triggered.

Otherwise, the UE shall perform intra-frequency measurements on lower or equal priority IAB cells.

Such measurements rule may also be applied for the UE in RRC connected mode for handover purpose.

Additionally, as IAB-donor has full control of IAB-nodes and UEs, it has the global information such as the load information of both itself and IAB-nodes camping on its coverage. Therefore, the IAB-donor may send signaling to the UE to force the UE to reselect if the UE is in IDLE or Inactive mode, or hand over if the UE is in RRC_Connected mode, from the current cell to another cell, for the purpose of, e.g., load balance, or controlling the hop number of traffic from UE to the IAB-donor.

If the UE is in RRC_Connected mode, the signaling can be the handover command directly, which may include at least target cell ID (the cell the IAB-donor wants to force the UE to handover to) and/or all information required to access the target cell so that the UE can access the target cell without reading system information, and/or some RRC configurations.

If the UE is in RRC_IDLE or Inactive mode, the signaling can also at least include the cell ID the IAB-donor wants the UE to reselect to.

When the IAB-donor is a serving cell for the UE, the IAB-donor sends signaling to UE directly; when the IAB-donor is not a serving cell but IAB-node is the one, the IAB-donor either sends signaling to the IAB-node informing the IAB-node to send the signaling to the UE, or the UE needs to monitor the IAB-donor as a non-serving cell for this message if it has the capability to distinguish the IAB-donor from IAB-node and detects IAB-donor is non-serving cell.

For idle or inactive Mode UE, such signaling is provided by the base station (IAB-donor or IAB-node) through broadcasting signaling, e.g., system information; for RRC_Connected Mode UE, such signaling is provided by the base station (IAB-donor or IAB-node) through dedicated RRC signaling, e.g., the RRCRelease message, or RRC Connection Reconfiguration message.

The above-mentioned features may be applicable to 3rd Generation Partnership Project; Technical Specification Group Radio Access Network; Study on Integrated Access and Backhaul; (Release 15) for 3GPP TR 38.874 V0.3.2 (2018-06) and applicable standards.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, subject to modifications and alternate constructions that are fully equivalent. Consequently, the present disclosure is not limited to the specific disclosed embodiments. On the contrary, the present invention covers all modifications and alternate constructions within the spirit and scope of the present disclosure. For example, the steps in the processes disclosed herein need not be performed in the same order as they have been disclosed, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An Integrated Access and Backhaul (IAB) node that communicates over a radio interface, the IAB node comprising:
   processing circuitry configured to:
   perform cell selection or cell reselection based on whether a corresponding cell is associated with an IAB donor or another IAB node, wherein the IAB donor performs at least one synchronization signal and physical broadcast channel (SS/PBCH) block transmission, the at least one SS/PBCH block transmission for the cell selection or the cell reselection; and
   forward signaling that is received from the IAB donor to a User Equipment (UE), the signaling for forcing the UE to reselect, or hand over from a current cell to, another cell, wherein:
   a hop number is defined for each of the IAB donor, the IAB node, and the other IAB node, and
   the hop number of the IAB donor is 0.

2. The IAB node of claim 1, wherein:
   a total number of Physical Random Access Channel (PRACH) preamble sequences associated with the cell selection or the cell reselection is 64, and
   a number of Random Access Preambles in a Random Access Preamble group dedicated for IAB backhaul use or dedicated for IAB UE use is configured by a network.

3. An Integrated Access and Backhaul (IAB) donor that communicates over a radio interface, the IAB donor comprising:
   transmitting circuitry configured to:
   perform at least one synchronization signal and physical broadcast channel (SS/PBCH) block transmission, the at least one SS/PBCH block transmission for cell selection or cell reselection; and
   send signaling to a User Equipment (UE) via an IAB node, the signaling for forcing the UE to reselect, or hand over from a current cell to, another cell, wherein:
   a hop number is defined for each of the IAB donor and the IAB node, and
   the hop number of the IAB donor is 0.

4. The IAB donor of claim 3, wherein:
   a total number of Physical Random Access Channel (PRACH) preamble sequences associated with the cell selection or the cell reselection is 64, and
   a number of Random Access Preambles in a Random Access Preamble group dedicated for IAB backhaul use or dedicated for IAB UE use is configured by a network.

5. A method for an Integrated Access and Backhaul (IAB) node that communicates over a radio interface, the method comprising:
   performing cell selection or cell reselection based on whether a corresponding cell is associated with an IAB donor or another IAB node, wherein the IAB donor performs at least one synchronization signal and physical broadcast channel (SS/PBCH) block transmission, the at least one SS/PBCH block transmission for the cell selection or the cell reselection; and
   forwarding signaling that is received from the IAB donor to a User Equipment (UE), the signaling for forcing the UE to reselect, or hand over from a current cell to, another cell, wherein:
   a hop number is defined for each of the IAB donor, the IAB node, and the other IAB node, and
   the hop number of the IAB donor is 0.

6. The method of claim 5, wherein:
   a total number of Physical Random Access Channel (PRACH) preamble sequences associated with the cell selection or the cell reselection is 64, and
   a number of Random Access Preambles in a Random Access Preamble group dedicated for IAB backhaul use or dedicated for IAB UE use is configured by a network.

* * * * *